(12) United States Patent
Noda

(10) Patent No.: US 10,349,034 B2
(45) Date of Patent: Jul. 9, 2019

(54) INFORMATION PROCESSING APPARATUS, STEREOSCOPIC DISPLAY METHOD, AND PROGRAM

(71) Applicant: SONY CORPORATION, Tokyo (JP)

(72) Inventor: Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/274,534

(22) Filed: Sep. 23, 2016

(65) Prior Publication Data

US 2017/0013249 A1  Jan. 12, 2017

Related U.S. Application Data

(63) Continuation of application No. 14/663,674, filed on Mar. 20, 2015, now Pat. No. 9,456,203, which is a
(Continued)

(30) Foreign Application Priority Data

Nov. 11, 2010 (JP) ................. 2010-253150

(51) Int. Cl.
| | |
|---|---|
| *G06F 3/00* | (2006.01) |
| *H04N 13/128* | (2018.01) |
| *H04N 13/156* | (2018.01) |
| *H04N 13/398* | (2018.01) |
| *G06F 3/01* | (2006.01) |

(Continued)

(52) U.S. Cl.
CPC ........... *H04N 13/128* (2018.05); *G06F 3/017* (2013.01); *G06F 3/0416* (2013.01);
(Continued)

(58) Field of Classification Search
CPC ............... G06F 3/03547; G06F 3/0416; G06F 3/04897; G06F 3/017; G06F 3/04883; H04N 13/128
(Continued)

(56) References Cited

U.S. PATENT DOCUMENTS

| | | | |
|---|---|---|---|
| 6,417,969 B1 * | 7/2002 | DeLuca ............ | G02B 27/2235 345/8 |
| 8,515,128 B1 * | 8/2013 | Hildreth ................. | G06F 3/017 345/156 |

(Continued)

FOREIGN PATENT DOCUMENTS

| | | |
|---|---|---|
| GB | 2462171 | 2/2010 |
| JP | 08-016137 | 1/1996 |

(Continued)

*Primary Examiner* — Jeffery A Williams
(74) *Attorney, Agent, or Firm* — Paratus Law Group, PLLC

(57) ABSTRACT

An apparatus and method provide logic for processing information. In one implementation, an apparatus may include a determination unit configured to determine a first spatial position of a portion of an operating tool disposed within a threshold distance of a surface of the determination unit. The first spatial position may be determined relative to the determination unit surface in a depth direction. The apparatus may also include a control unit configured to generate a first signal to display a stereoscopic image to a user at a first display position. The first display position may be disposed within a predetermined distance of the first spatial position.

19 Claims, 22 Drawing Sheets

Related U.S. Application Data continuation of application No. 13/277,850, filed on Oct. 20, 2011, now Pat. No. 8,988,499.

(51) Int. Cl.
    *G06F 3/041*     (2006.01)
    *G06T 7/70*     (2017.01)
    *G06T 7/593*     (2017.01)
    *G06T 3/40*     (2006.01)
    *H04N 13/30*     (2018.01)
    *H04N 13/122*     (2018.01)
    *H04N 13/183*     (2018.01)

(52) U.S. Cl.
    CPC ............ *G06F 3/0418* (2013.01); *G06T 3/40* (2013.01); *G06T 7/593* (2017.01); *G06T 7/70* (2017.01); *H04N 13/122* (2018.05); *H04N 13/156* (2018.05); *H04N 13/30* (2018.05); *H04N 13/398* (2018.05); *G06F 2203/04101* (2013.01); *H04N 13/183* (2018.05)

(58) Field of Classification Search
    USPC .......................................................... 348/43
    See application file for complete search history.

(56) References Cited

U.S. PATENT DOCUMENTS

| | | | |
|---|---|---|---|
| 8,601,402 B1 * | 12/2013 | Habboub | .............. G06F 3/00 715/782 |
| 2006/0203085 A1 | 9/2006 | Tomita | |
| 2008/0309660 A1 | 12/2008 | Bertolami et al. | |
| 2010/0039504 A1 | 2/2010 | Takahashi et al. | |
| 2010/0053151 A1 | 3/2010 | Marti et al. | |
| 2010/0095206 A1 | 4/2010 | Kim | |

FOREIGN PATENT DOCUMENTS

| | | |
|---|---|---|
| JP | 09-218963 | 8/1997 |
| JP | 2004-192294 | 7/2004 |
| JP | 2006-293878 | 10/2006 |
| JP | 2010-045584 | 2/2010 |
| JP | 2011-108152 | 6/2011 |
| JP | 2012-032964 | 2/2012 |
| WO | WO2007/097225 A1 | 8/2007 |
| WO | WO 2008-111495 A1 | 9/2008 |
| WO | WO2009-111329 A2 | 9/2009 |

* cited by examiner

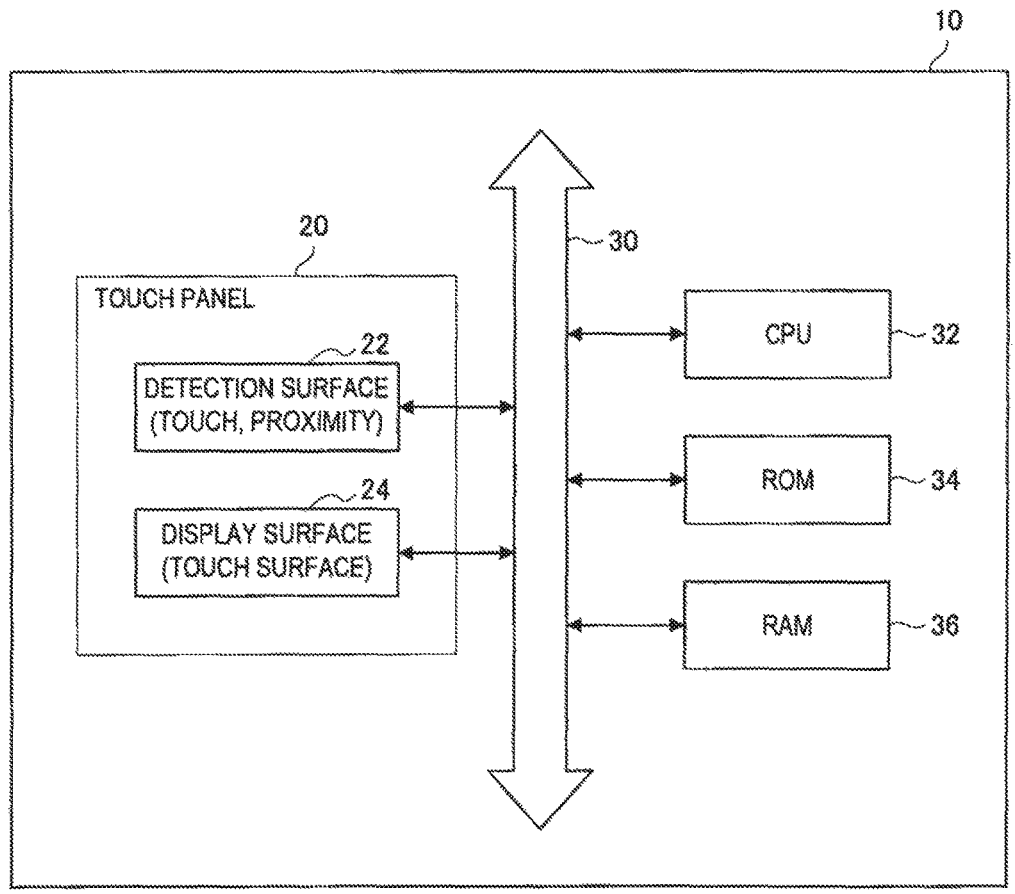
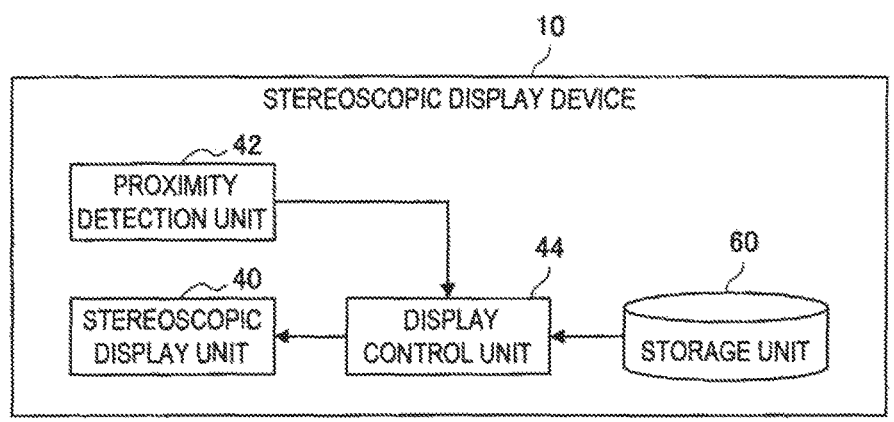

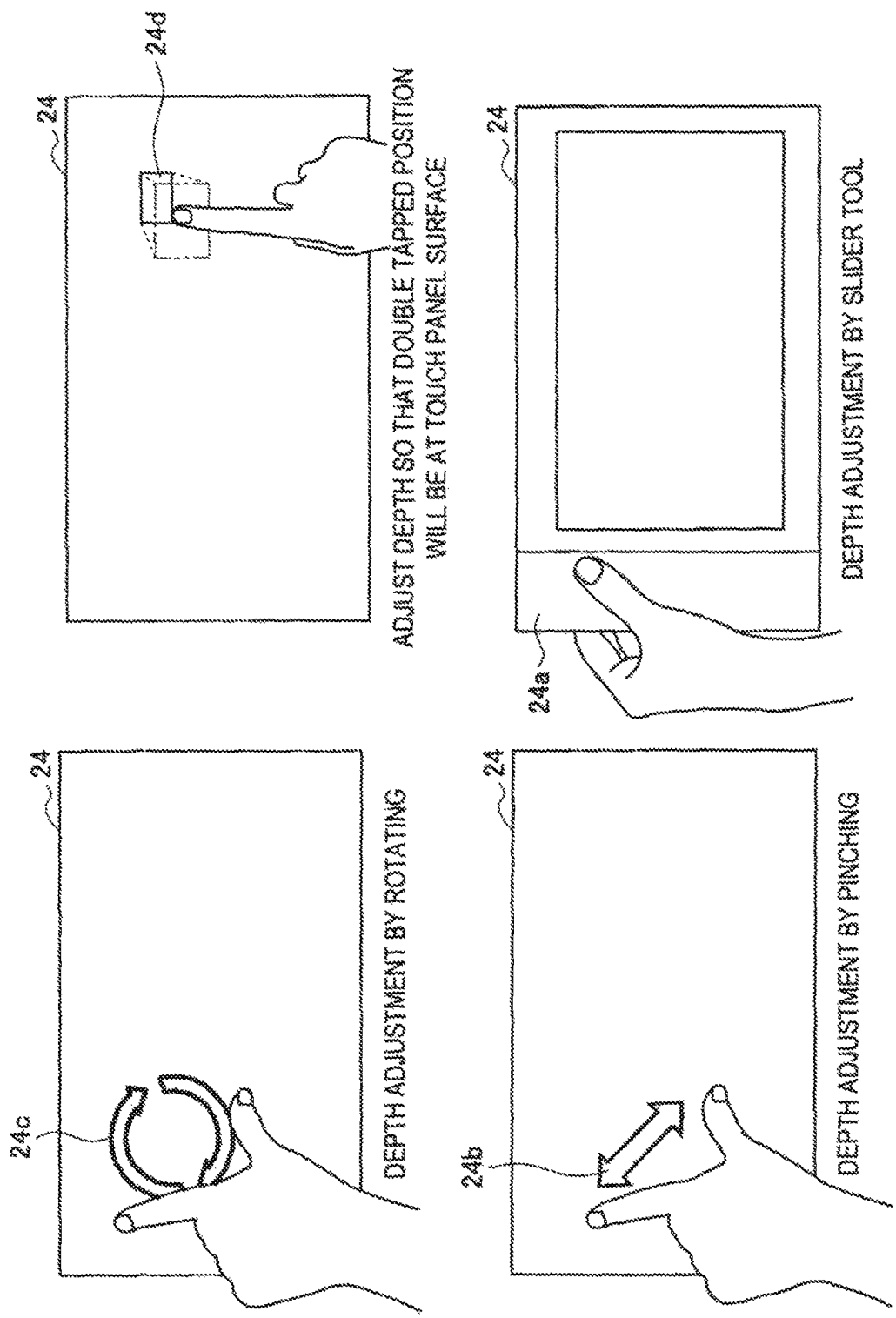

INFORMATION PROCESSING APPARATUS, STEREOSCOPIC DISPLAY METHOD, AND PROGRAM

CROSS-REFERENCE TO RELATED APPLICATIONS

This application is a continuation of U.S. patent application Ser. No. 14/663,674 (filed on Mar. 20, 2015), which is a continuation of U.S. patent application Ser. No. 13/277,850 (filed on Oct. 20, 2011 and issued as U.S. Pat. No. 8,988,499 on Mar. 24, 2015), which claims priority to Japanese Patent Application 2010-253150 (filed on Nov. 11, 2010), which are hereby incorporated by reference in their entirety.

BACKGROUND

Technical Field

The disclosed exemplary embodiments relate to an information processing apparatus, a stereoscopic display method, and a computer-readable medium.

Description of the Related Art

In recent years, stereoscopic display devices capable of stereoscopically displaying display objects such as image content, such as a stereoscopic photograph, and an operation object are being put to practical use, and are becoming widespread. For example, some display devices for televisions, portable game machines and personal computers (hereinafter, a PC) capable of stereoscopic display are already put on the market. In relation to such stereoscopic display devices, Japanese Patent Application No. JP 2010-045584A, for example, discloses a method for correcting a stereoscopic image capable of accurately expressing the amount of pop-out, the amount of pull-back (hereinafter, the amount of depth), or the like, intended by a creator of a display object.

SUMMARY

However, when stereoscopically displaying an image in a virtual three-dimensional space, an issue arises that would not have arisen if the image was displayed two-dimensionally. Specifically, when an object in a real space overlaps with an object that is stereoscopically displayed in a virtual three-dimensional space, a mismatch, regarding the sense of distance, occurs between the object actually having a three-dimensional shape and the display object which is stereoscopically shown by virtually realizing a disparity, thereby giving a viewing user an odd feeling. For example, a visual mismatch that would not occur in the real space, such as a mismatch that a part which should be in the foreground is hidden by a thing in the background, is sometimes caused, giving the user an unpleasant feeling.

In light of the foregoing, it is desirable to provide an information processing apparatus, a stereoscopic display method, and a program which are novel and improved, and which are capable of reducing an odd feeling or an unpleasant feeling experienced by a user when an object in the real space approaches a display surface on which a display object is stereoscopically displayed.

Consistent with an exemplary embodiment, an information processing apparatus includes a determination unit configured to determine a first spatial position of a portion of an operating tool disposed within a threshold distance of a surface of the determination unit. The first spatial position is determined relative to the determination unit surface in a depth direction. A control unit configured to generate a first signal to display a stereoscopic image to a user at a first display position. The first display position is within a predetermined distance of the first spatial position.

Consistent with an additional exemplary embodiment, a computer-implemented method includes determining a first spatial position of a portion of an operating tool disposed within a threshold distance of a surface of the determination unit. The first spatial position is determined relative to the determination unit surface in a depth direction. A first signal is generated to display a stereoscopic image to a user at a first display position. The first display position is within a predetermined distance of the first spatial position.

Consistent with an additional exemplary embodiment, a non-transitory computer-readable medium stores instructions that, when executed by a processor, cause the processor to perform a method that includes determining a first spatial position of a portion of an operating tool disposed within a threshold distance of a surface of the determination unit. The first spatial position is determined relative to the determination unit surface in a depth direction. A first signal is generated to display a stereoscopic image to a user at a first display position. The first display position is within a predetermined distance of the first spatial position According to the disclosed exemplary embodiments, an odd feeling or an unpleasant feeling experienced by a user when an object in the real space approaches a display surface on which a display object is stereoscopically displayed can be reduced.

BRIEF DESCRIPTION OF THE DRAWINGS

FIG. 1 is a hardware configuration diagram of an information processing apparatus according to an exemplary disclosed embodiment;

FIG. 2 is a functional configuration diagram of the information processing apparatus according a first exemplary embodiment;

FIG. 24 is a diagram for explaining depth adjustment.

DETAILED DESCRIPTION

Figure 3:
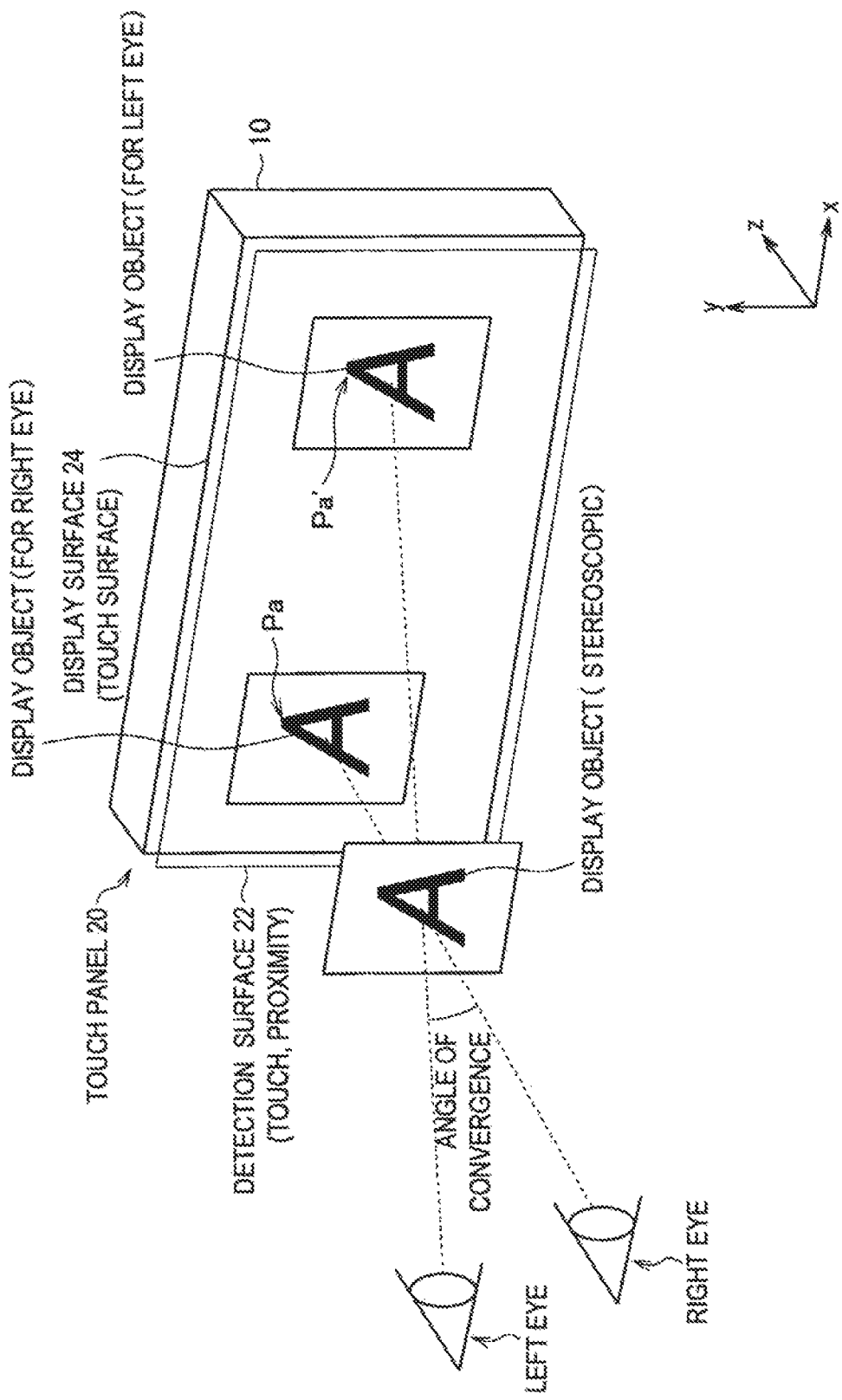
FIG. 3 is a diagram for explaining the principle of stereoscopic display.

Hereinafter, exemplary embodiments will be described in detail with reference to the appended drawings. Note that, in this specification and the appended drawings, structural elements that have substantially the same function and configuration are denoted with the same reference numerals, and repeated explanation of these structural elements is omitted.

Additionally, an explanation will be given in the following order.

1. Hardware Configuration of Stereoscopic Display Device
2. Functional Configuration of Stereoscopic Display Device (First Exemplary Embodiment)
3. Depth Control by Stereoscopic Display Device (First Exemplary Embodiment)
4. Depth Control Process (First Exemplary Embodiment)
5. Control of XY Coordinates (First Exemplary Embodiment)
6. Functional Configuration of Stereoscopic Display Device (Second Exemplary Embodiment)
7. Depth/Edit Control by Stereoscopic Display Device (Second Exemplary Embodiment)
8. Depth/Edit Control by Stereoscopic Display Device (Second Exemplary Embodiment)
9. An Exemplary Depth/Edit Control Process (Second Exemplary Embodiment)
10. An Additional Exemplary Depth/Edit Control Process (Second Exemplary Embodiment)
11. Reduction/Enlargement Control by Stereoscopic Display Device (Third Exemplary Embodiment)
12. Combinations of Additional Exemplary Embodiments Information processing apparatuses typically include a touch screen. The information processing apparatuses may be personal computers (PCs), smartphones, personal digital assistants, music players, game terminals, digital home appliances, or the like. The information processing apparatuses may also be peripheral devices to be connected with the above devices. Furthermore, the information processing apparatuses according to respective exemplary embodiments are stereoscopic display devices capable of displaying an object that is stereoscopically displayed (three-dimensionally displayed) on a display that can be stereoscopically viewed. In the following, an explanation will be given taking a stereoscopic photograph as an example of one or more display objects included in stereoscopically displayed image content.

In the following, the information processing apparatuses according to the first to third exemplary embodiments will be described taking a stereoscopic display device 10 as an example. The present embodiments propose a stereoscopic display method capable of reducing an odd feeling or an unpleasant feeling experienced by a user when an object in the real space approaches a display object that is stereoscopically displayed on the stereoscopic display device 10.

1. Hardware Configuration of Stereoscopic Display Device

FIG. 1 is a block diagram showing an example of a hardware configuration of the stereoscopic display device 10 according to exemplary disclosed embodiments. Referring to FIG. 1, the stereoscopic display device 10 includes a touch panel 20, a bus 30, a CPU (Central Processing Unit) 32, a ROM (Read Only Memory) 34, and a RAM (Random Access Memory) 36.

The touch panel 20 includes a determination surface, and example of which is detection surface 22, and a display surface (touch surface) 24. The detection surface 22 detects proximity or contact of an operating tool (a user's finger or a pen) with the touch panel 20, and generates an electric signal indicating the proximity position or the contact position. The touch panel 20 is an example of an input device for inputting information. The detection surface 22 may be formed according to an arbitrary touch detection method such as a pressure-sensitive method, a capacitive method, or an infrared method, for example. The touch panel 20 may be a touch panel capable of detecting only contact to the display surface 24, but, preferably, it is capable of detecting proximity and contact.

The display surface 24 displays an output image from the stereoscopic display device 10. The display surface 24 can be realized by using a liquid crystal, an organic light-emitting diode (e.g., an organic EL: OLED) or a cathode ray tube (CRT), for example. A method that uses glasses, an autostereoscopic method that uses a parallax barrier or a lenticular lens, or the like may be used for the display that allows stereoscopic viewing.

The bus 30 interconnects the detection surface 22, the display surface 24, the CPU 32, the ROM 34, and the RAM 36. The CPU 32 controls the entire operation of the stereoscopic display device 10. The ROM 34 stores programs and data constituting software to be executed by the CPU 32. The RAM 36 temporarily stores programs and data at the time of execution of processes by the CPU 32. Additionally, the stereoscopic display device 10 may also include structural elements other than the structural elements shown in FIG. 1.

2. Functional Configuration of Stereoscopic Display Device (First Exemplary Embodiment)

Next, a functional configuration of the stereoscopic display device 10 according to the first exemplary embodiment will be described with reference to FIG. 2. The stereoscopic display device 10 according to the present exemplary embodiment includes a stereoscopic display unit 40, a determination unit, an example of which is a proximity detection unit 42, a display control unit 44, and a storage unit 60.

The touch panel 20 is provided on the display surface of the stereoscopic display unit 40. The stereoscopic display unit 40 stereoscopically displays image content. The image content is a video or a still image having disparity information, such as a stereoscopic video or the like. Here, an explanation will be given taking, as an example, image content including stereoscopic photograph(s) as one or more display objects each having individual disparity information.

The proximity detection unit 42 detects proximity of an operating tool to the touch surface of the stereoscopic display unit 40. Here, an explanation will be given taking a user's finger as an example of the operating tool. In the case proximity of the operating tool is detected, the display control unit 44 takes a stereoscopic photograph, among the one or more stereoscopic photographs included in the image content, that is displayed in the depth direction of the proximity position of the operating tool as a control target, and controls the position of this stereoscopic photograph to be nearer to the proximity position of the operating tool. The storage unit 60 stores the image content, the amount of depth of a stereoscopic photograph included in the image content, and the like.

The display control unit 44 reads image data stored in the storage unit 60, and causes the stereoscopic display unit 40 to display the image data that has been read. The display control unit 44 also causes the stereoscopic display unit 40 to display video content, a graphical user interface (GUI), and the like. At this time, the display control unit 44 performs computation for stereoscopically displaying the display object such as the image data, the video content, the GUI, or the like. For example, the display control unit 44 performs computation of the amount of depth for causing the display object to pop out of the display surface of the stereoscopic display unit 40 or to be pushed back behind the display surface.

In the case of displaying a stereoscopic photograph in a virtual three-dimensional space, in addition to depth information held by the virtual three-dimensional space itself, the stereoscopic photograph itself also holds disparity information. A schematic diagram of the case where there is a stereoscopic photograph in a three-dimensional space is shown in FIG. 3. In this case, since a photograph for a right eye and a photograph for a left eye are on the display surface 24, they are seen on the display surface 24, but A shown in the photograph is seen popping out of the display surface 24. The principle of this stereoscopic display will be briefly described. To stereoscopically show a display object, a display object for a right eye and a display object for a left eye are displayed apart from each other on the display surface, as shown in FIG. 3, and the display object for a right eye is made to be seen only by the right eye and the display object for a left eye is made to be seen only by the left eye. To have the display object for a right eye seen only by the right eye and the display object for a left eye seen only by the left eye, polarization is used in many cases. For example, the display object for a right eye is displayed by light linearly polarized in a first direction, and the display object for a left eye is displayed by light linearly polarized in a second direction that is orthogonal to the first direction. Furthermore, by wearing a lens that lets the light linearly polarized in the first direction through on the right eye and a lens that lets the light linearly polarized in the second direction through on the left eye, a situation where only the display object for a right eye can be seen by the right eye and only the display object for a left eye can be seen by the left eye can be created.

When such a situation is created, the display object is seen to be stereoscopically displayed at a position where the line of sight connecting the right eye and the display object for a right eye and the line of sight connecting the left eye and the display object for a left eye crosses. Also, by controlling the distance between the display object for a right eye and the display object for a left eye, the angle of convergence can be adjusted. The degree of pop-out of a display object that is stereoscopically displayed changes with the change in the angle of convergence.

That is, by controlling the display positions by changing the amount of depth of the display objects for a right eye and a left eye on the display surface, the degree of pop-out or the degree of push-back of the display object that is stereoscopically displayed can be controlled. Additionally, a method for realizing the stereoscopic display by using polarization has been described here, but the present exemplary embodiment is not limited to this, and application of any stereoscopic display method that is capable of stereoscopically displaying a display object is possible.

Referring back to FIG. 1, the display control unit 44 causes a display object to be stereoscopically displayed by controlling the display of the display objects for a right eye and a left eye. Information indicating the degree of pop-out or the degree of push-back (hereinafter, the amount of depth or the depth information) of the display object determined by the display control unit 44 is input to the stereoscopic display unit 40. The data of the display object read from the storage unit 60 by the display control unit 44 is also input to the stereoscopic display unit 40. When the amount of depth is input, the stereoscopic display unit 40 displays the display object based on the amount of depth that is input.

Additionally, the function of the display control unit 44 is realized using the CPU 32 or the like. Also, the function of the storage unit 60 is realized by the ROM 34 or the RAM 36 (or a tangible, non-transitory removable recording medium or the like that is not shown).

3. Depth Control by Stereoscopic Display Device (First Exemplary Embodiment)

In the case of performing operation using the touch panel 20, the part of the stereoscopic photograph popping out of the surface and the operating tool sometimes overlap with each other. For example, in FIG. 3, such a situation arises when the operating tool comes near the display surface 24. An inconsistency arises in the depth information, causing an odd feeling regarding the appearance. For example, with respect to a stereoscopic photograph that is displayed popping out of the display surface, the operating tool is displayed as if it is sunk into the stereoscopic photograph, thereby giving an odd feeling or an unpleasant feeling to the user. Accordingly, the present exemplary embodiment performs the following automatic depth control as a solution for solving this phenomenon. According to this automatic depth control, the touch panel 20 detects that the operating tool is about to overlap with the stereoscopic photograph, and the position of the stereoscopic photograph in the depth direction is automatically changed based on the depth information obtained from the disparity information held by the stereoscopic photograph so that the stereoscopic photograph does not overlap with the operating tool.

Additionally, the stereoscopic photograph itself includes a plurality of textures (stereoscopic photographs, in this case) having disparities, but an explanation will be given, for the disclosed exemplary embodiments, taking as an example a case where there are two disparities. At this time, the stereoscopic photograph includes textures to be projected to both left and right eyes (a photograph for a right eye and a photograph for a left eye, in this case), and, thus, which point in one of the textures corresponds to which point in the other texture can be estimated. Such methods include a method called template matching.

Figure 4:
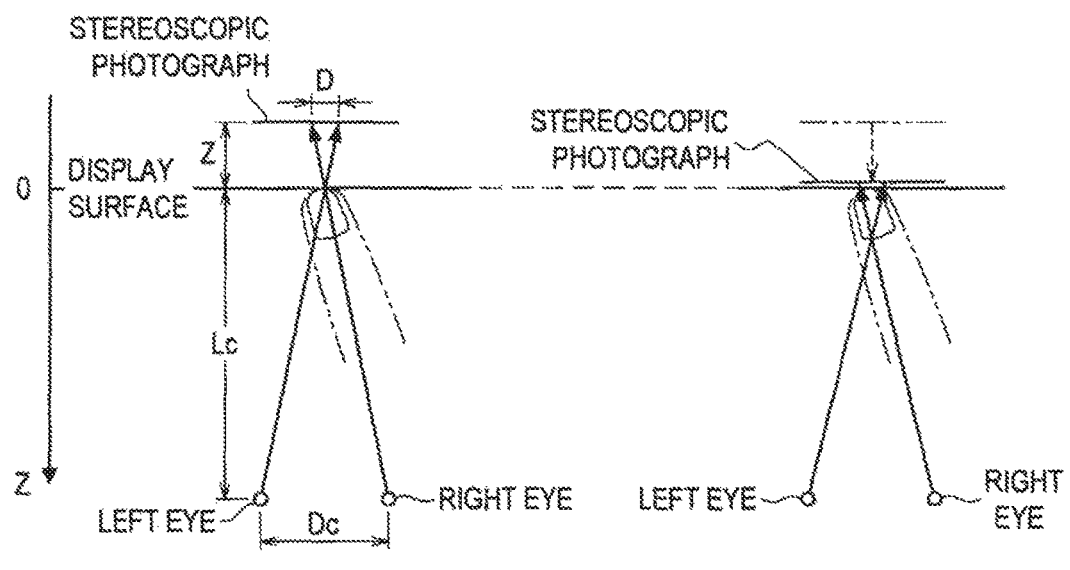
FIG. 4 is a diagram for explaining depth control by a stereoscopic display device according to the first exemplary embodiment.

The depth control by the stereoscopic display device 10 according to the present exemplary embodiment will be further described with reference to FIGS. 3 and 4. As shown in FIG. 4, in the case contact of the operating tool on the display surface 24 is detected (touch detection), the display control unit 44 takes the stereoscopic photograph that is the display object displayed in the depth direction of the touched position as the control target, and calculates the position of the stereoscopic photograph in the depth direction (the amount of depth).

When using the template matching, search is conducted along the horizontal direction as to where in an image for a left eye A an arbitrary point Pa in an image for a right eye A in FIG. 3 is close to, for example. The relative shift (pixel difference) between the point Pa in the image for a right eye A and a target point Pa' in the image for a left eye A is a disparity, and the amount of depth from the touch surface (display surface 24) is expressed by a point obtained by applying the relative shift to the stereoscopic space.

Specifically, when taking the relative shift between the left and right images of the stereoscopic photograph of the left diagram of FIG. 4 as D, the distance between the eyes and the display surface 24 as Lc, the space between the left and right eyes as Dc, and the position (the amount of depth), in the depth direction, of the stereoscopic photograph to be obtained as Z, and when the depth of the display surface 24 is made 0, the amount of depth Z of the stereoscopic photograph is expressed by formula (1), as follows:

$$Z=D/Dc\times Lc. \quad (1)$$

In this manner, the amount of depth Z at the proximity position or the contact position of the operating tool is calculated, the stereoscopic photograph is shifted deeper by the amount of depth Z such that a transition is made from the right diagram to the left diagram of FIG. 4, and the depth of the stereoscopic photograph from the display surface is made Z. This shifts the state from a state where the finger is sunk into a protruding part of the stereoscopic photograph (the right diagram of FIG. 4) to the state where the protruding part of the stereoscopic photograph coincides with the operating tool (finger) or the display surface 24 (the left diagram of FIG. 4), and an odd feeling or an unpleasant feeling experienced by the user can be reduced.

Additionally, the technique of fast stereo matching which is for measuring the distance to the target object based on the disparity between two images acquired by stereo cameras may also be used for computation of the amount of depth Z instead of the template matching. When using this technique, the accuracy of calculation of the amount of depth can be increased.

As described above, when contact of the operating tool on the display surface 24 is detected by the proximity detection unit 42, the display control unit 44 performs control such that the position, in the depth direction, of the display object which is the control target coincides with the display surface 24.

Next, depth control by the stereoscopic display device 10 for a case regarding not only the contact state but also a proximity state will be described with reference to FIG. 5. As shown in the left diagram of FIG. 5, in the case proximity of the operating tool to the display surface 24 is detected by the proximity detection unit 42 (that is, proximity detection unit 42 determines a first spatial position of a portion of the operating tool falling within a threshold distance of the display surface), the display control unit 44 takes the stereoscopic photograph displayed in the depth direction of the proximity position (that is, the first spatial position) as the control target, and calculates a first display position of the stereoscopic photograph in the depth direction (the amount of depth Z). The display control unit 44 performs control such that the position, in the depth direction, of the stereoscopic photograph which is the control target comes near or coincides with the proximity position of the operating tool, based on the calculated amount of depth Z and the distance between the proximity position and the display surface.

Figure 5:
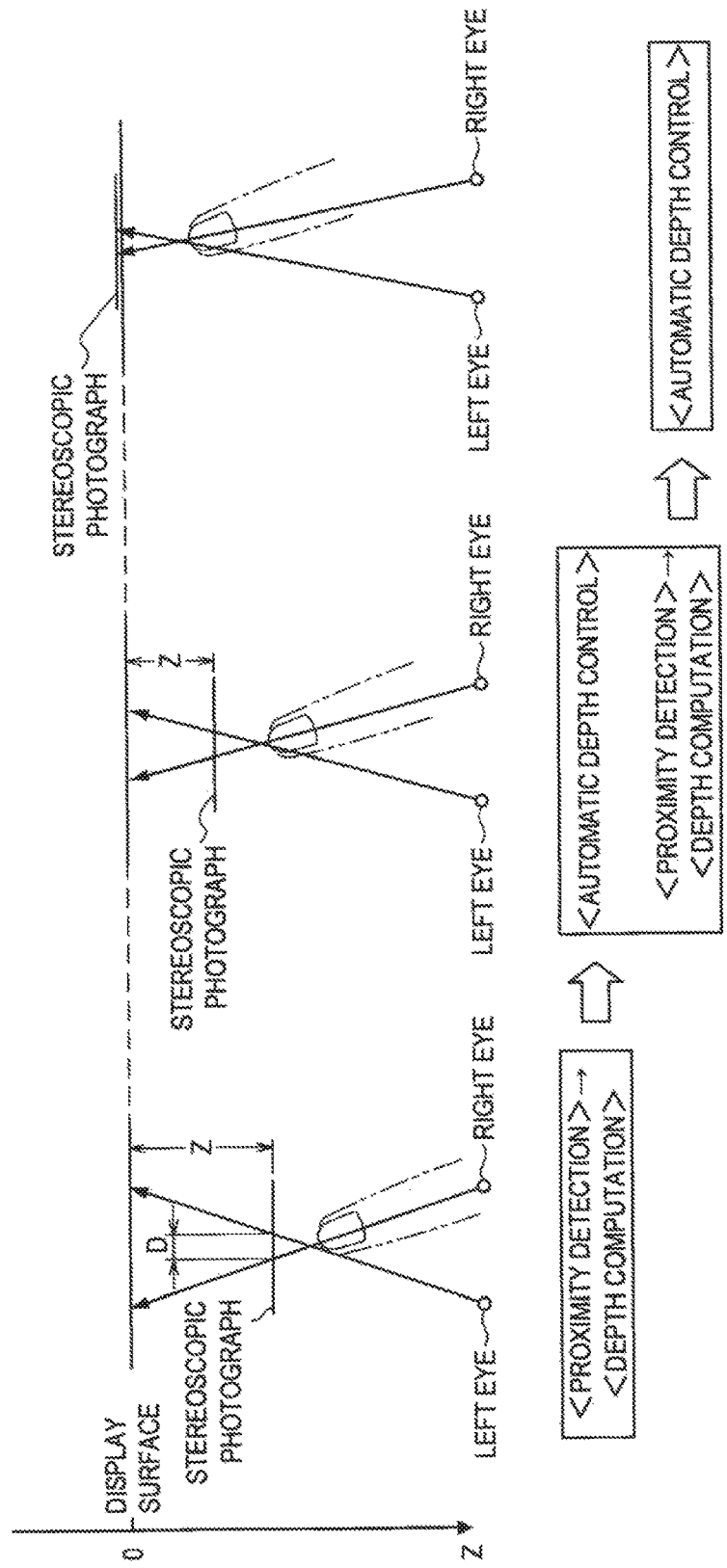
FIG. 5 is a diagram for explaining depth control by the stereoscopic display device according to the first exemplary embodiment.

Furthermore, as shown in the middle and right diagrams of FIG. 5, movement of the operating tool is detected, and the computation of the amount of depth is repeated by the display control unit 44 along with the detection. As the distance between the display surface 24 and the proximity position of the operating tool (that is, a second spatial position) is decreased, the display control unit 44 automatically controls the depth so that the position of the stereoscopic photograph in the depth direction (that is, a second display position) comes near or coincides with the display surface 24. The proximity detection unit 42 repeats the depth control described above until the operating tool is separated from the display surface 24 by at least a predetermined distance.

4. Depth Control Process (First Exemplary Embodiment)

Figure 6:
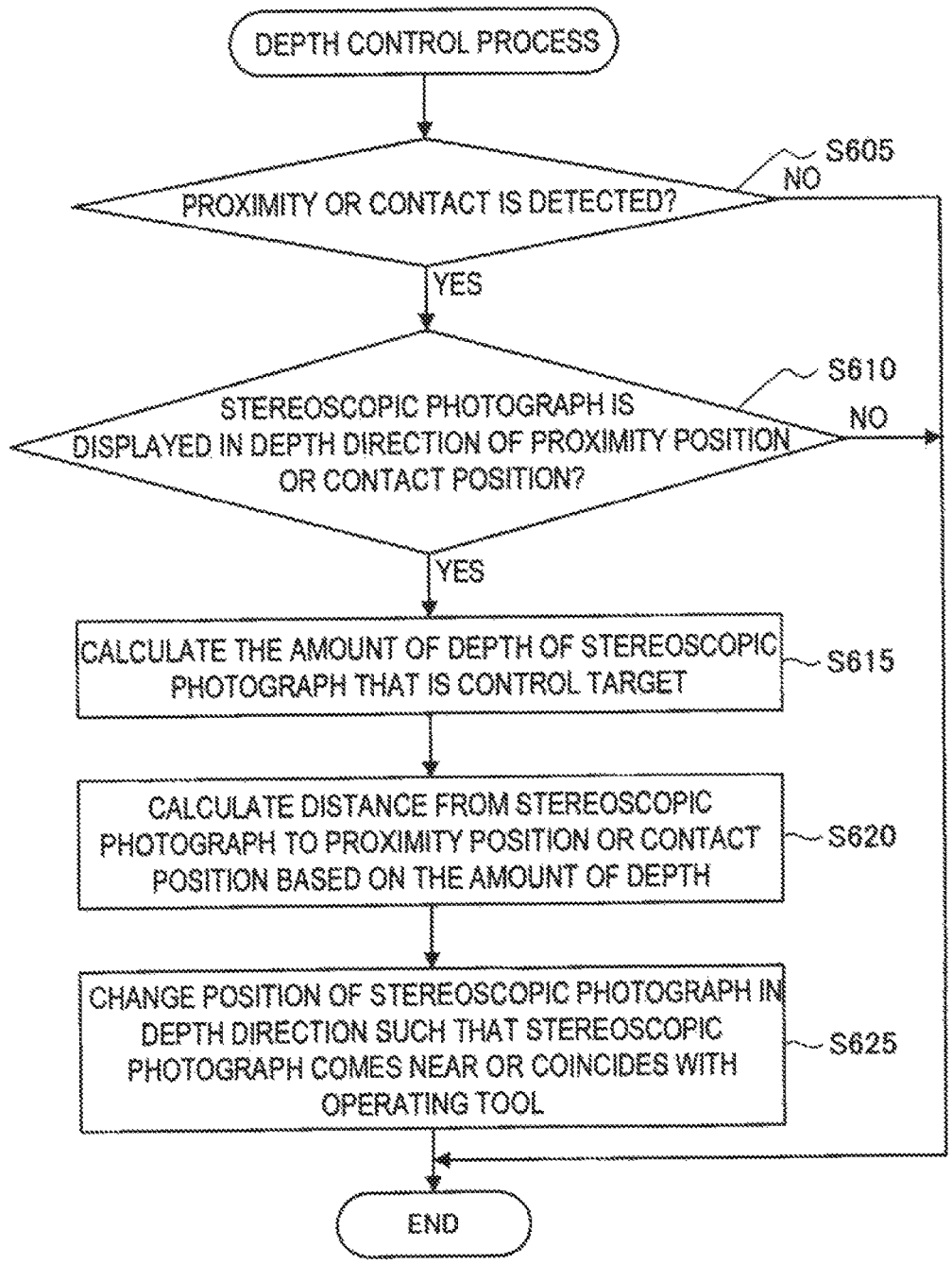
FIG. 6 is a flow chart showing a depth control process by the stereoscopic display device according to the first exemplary embodiment.

Next, an operation of the stereoscopic display device 10 according to the present exemplary embodiment will be described. FIG. 6 is a flow chart showing a depth control process for an operation of the stereoscopic display device 10. When the depth control process is started, the display control unit 44 determines whether proximity or contact of the operating tool is detected by the proximity detection unit 42 (step S605). In the case neither proximity nor contact is detected, the display control unit 44 immediately ends the process. On the other hand, in the case proximity or contact is detected, the display control unit 44 determines whether the stereoscopic photograph is displayed in the depth direction of the detected proximity position or contact position (step S610). Additionally, the display control unit 44 may determine that the stereoscopic photograph is displayed in the depth direction of the detected proximity position or contact position even if the stereoscopic photograph is displayed at a position somewhat deviated from the depth direction of the detected proximity position or contact position.

In the case the stereoscopic photograph is not displayed in such a manner, the display control unit 44 determines that there is no control target, and immediately ends the process. On the other hand, in the case the stereoscopic photograph is displayed in such a manner, the display control unit 44 calculates the amount of depth (that is, a first displacement in a depth direction) of the stereoscopic photograph, which is the control target, by the computational method described above (step S615).

Next, the display control unit 44 calculates the distance from the stereoscopic photograph to the proximity position or the contact position (that is, a second displacement in the depth direction) based on the calculated amount of depth (step S620). The position of the stereoscopic photograph in the depth direction is changed based on the calculation result so that the stereoscopic photograph comes near or coincides with the operating tool (step S625). In such an embodiment, as described above in reference to FIG. 4, a displacement between the first spatial position and the first display position in the depth direction exceeds a corresponding displacement between the second spatial position and the second display position, i.e., the stereoscopic is disposed closer to the operating tool portion than the second spatial position.

As described above, according to the stereoscopic display device 10 of the first exemplary embodiment, when the operating tool comes near or touches the display surface 24, the proximity position or the contact position is detected. Then, when the stereoscopic photograph that is displayed in the depth direction of the proximity position or the contact position is popping out of the display surface 24, the position of the stereoscopic photograph is shifted to be deeper such that the operating tool and the stereoscopic photograph will be displayed without overlapping with each other. On the other hand, when the stereoscopic photograph is displayed, being more pressed down than the display surface 24, the stereoscopic photograph is displayed with its position shifted forward so that the stereoscopic photograph is drawn to the operating tool and touches the operating tool. This enables the stereoscopic photograph to be displayed being moved so as to come near or coincide with the operating tool while preventing the protrusions or recesses of the stereoscopic photograph from overlapping with the operating tool in the stereoscopic space, and operations that are performed with two-dimensional applications, such as tapping, dragging, and a flick operation, can be realized with the three-dimensional application including the stereoscopic photograph without an odd feeling.

5. Control of XY Coordinates (First Exemplary Embodiment)

Figure 7:
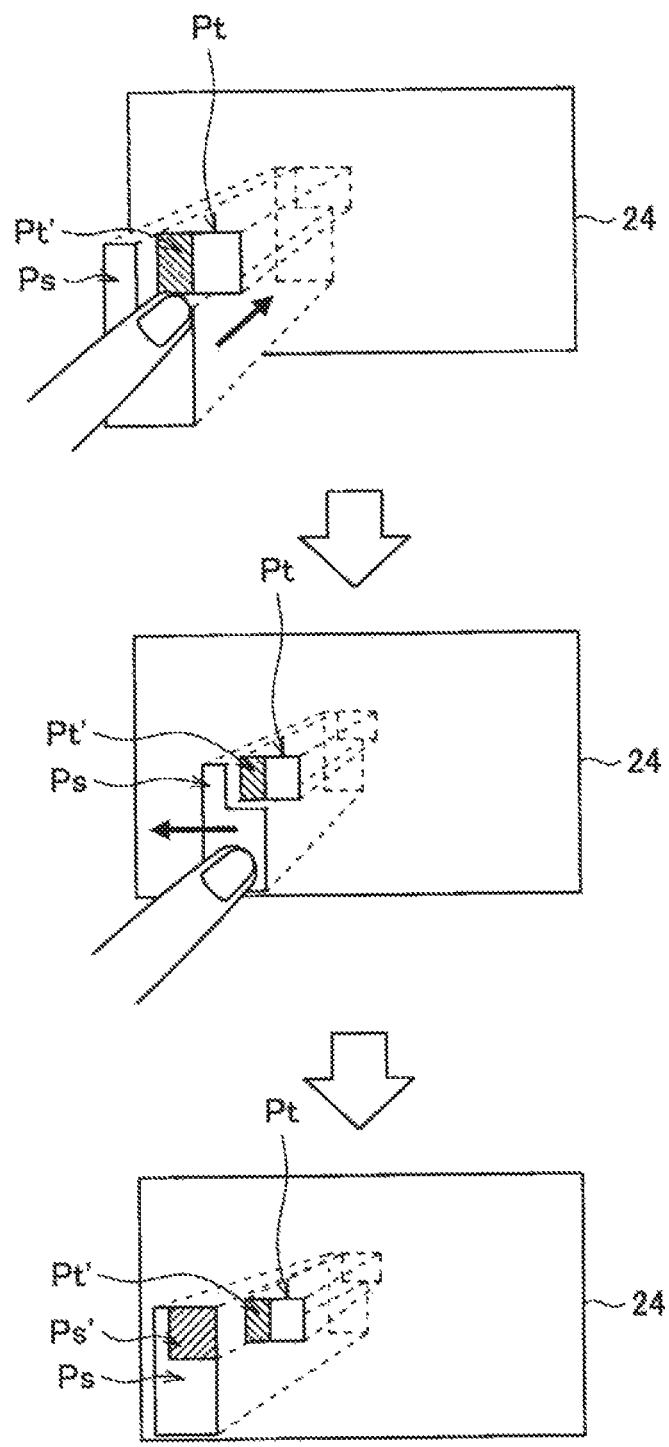
FIG. 7 is a diagram for explaining control of XY coordinates by the stereoscopic display device according to the first exemplary embodiment.

The direction in which the display position of the stereoscopic photograph is moved may be the depth direction as described above or either of vertical and horizontal directions parallel to the display surface 24. For example, in the top diagram of FIG. 7, stereoscopic photographs Ps and Pt are displayed popping out of the display surface 24. FIG. 7 shows a case where stereoscopic photographs are displayed being overlapped with each other. Here, a subject Pt' (display object) is included in the stereoscopic photograph Pt, and a subject Ps' (display object) is included in the stereoscopic photograph Ps. The subject Ps' of the stereoscopic photograph Ps is positioned in the front of the stereoscopic photograph Pt while the subject Pt' of the stereoscopic photograph Pt is positioned in the back of the stereoscopic photograph Ps, and, when seen as a whole, the subject Pt' of the stereoscopic photograph Pt in the back is seen to partially block the subject Ps' (protruding part) of the stereoscopic photograph Ps in the front. Such stereoscopic display does not occur in the real space, and thus causes the user to experience an odd feeling.

As shown in the top diagram of FIG. 7, the operating tool is neared to the stereoscopic photographs Ps and Pt in this display state. Then, in accordance with the movement of the operating tool, the display control unit 44 pushes back the stereoscopic photograph Ps and the stereoscopic photograph Pt towards the direction of the display surface 24. Next, as shown in the middle diagram of FIG. 7, when the operating tool moves the stereoscopic photograph Ps, which is the control target, in a direction parallel to the display surface 24 (left, in this case), the display control unit 44 moves the position of the stereoscopic photograph Ps in the direction parallel to the display surface 24 and performs control such that the position of the stereoscopic photograph Ps comes near or coincides with the proximity position of the operating tool. This causes the stereoscopic photograph Ps to be displayed on the left of the stereoscopic photograph Pt. As a result, as shown in the bottom diagram of FIG. 7, a state where the subject Ps' of the stereoscopic photograph Ps in the front is blocked by the subject Pt' of the stereoscopic photograph Pt in the back can be solved. Additionally, the stereoscopic photograph Ps may be shifted in XY directions (directions parallel to the display surface 24) after the depth direction of the stereoscopic photograph Ps is changed, as shown in FIG. 7, or the stereoscopic photograph Ps may be shifted in the XY directions without the depth direction of the stereoscopic photograph Ps being changed.

6. Functional Configuration of Stereoscopic Display Device (Second Exemplary Embodiment)

Figure 8:
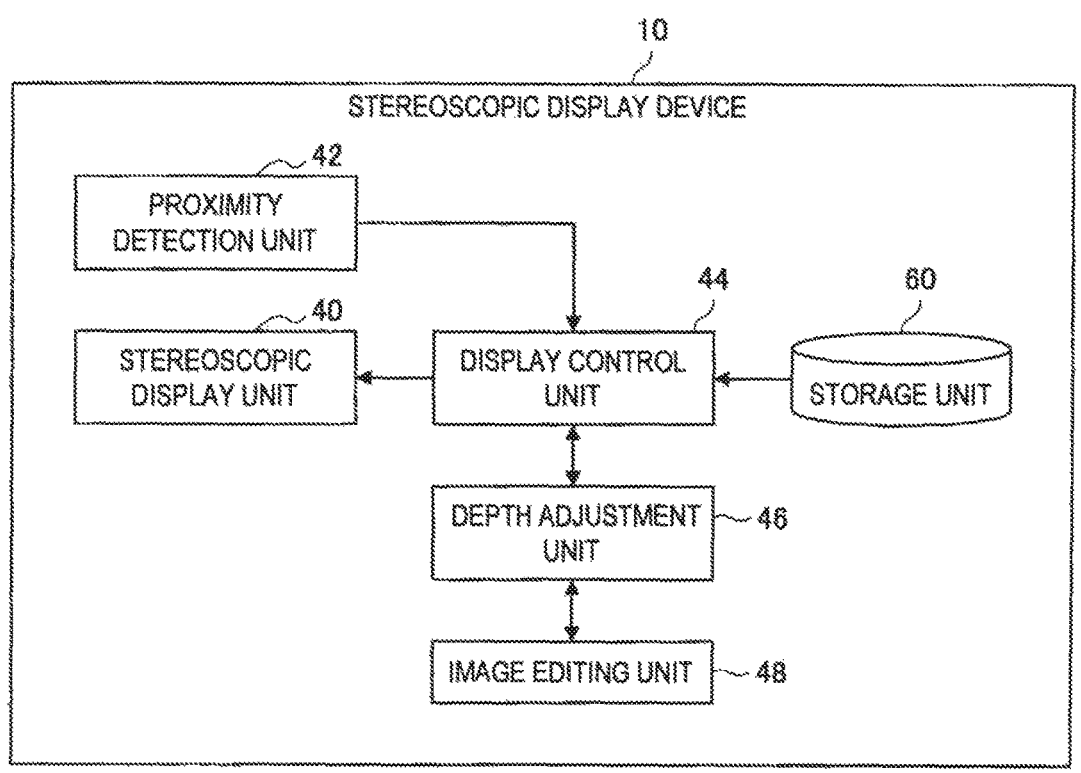
FIG. 8 is a functional configuration diagram of the information processing apparatuses according to second and third exemplary embodiments.

Next, a functional configuration of the stereoscopic display device 10 according to the second embodiment will be described with reference to FIG. 8. According to the stereoscopic display device 10 of the second exemplary embodiment, an edit control such as writing is performed together with the automatic depth control described in the first exemplary embodiment.

The stereoscopic display device 10 according to the second exemplary embodiment includes a stereoscopic display unit 40, a proximity detection unit 42, a display control unit 44, a depth adjustment unit 46, an image editing unit 48, and a storage unit 60. Among the above, the depth adjustment unit 46 and the image editing unit 48, which were not included in the functional configuration of the first exemplary embodiment, will be mainly described. The depth adjustment unit 46 adjusts, according to an operation by an user, the position of the display object which is the control target in the depth direction. The image editing unit 48 performs editing of obtaining a desired image in a stereoscopic space where image content is stereoscopically displayed, by drawing an image on a stereoscopic photograph or a sheet surface that is virtually overlaid on a stereoscopic photograph. The sheet (texture) on which drawing is performed at this time may be the texture (display surface 24) of the photograph itself, or the original stereoscopic photograph and the edit content may be separately managed by providing a texture (sheet surface) for writing at the same position as the texture of the photograph itself. Here, a case of drawing an image on the sheet surface will be described.

7. Depth/Edit Control by Stereoscopic Display Device (Second Exemplary Embodiment)

Figure 9:
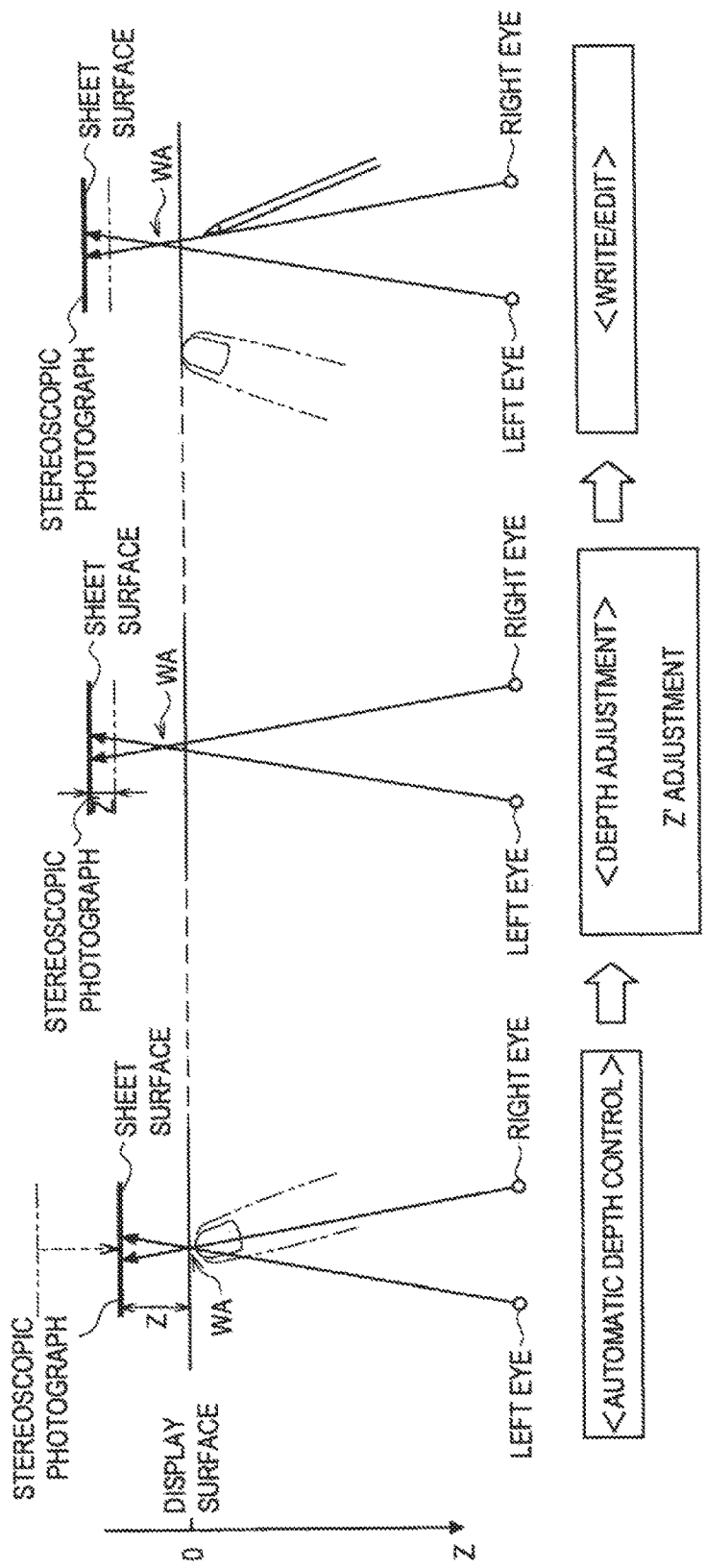
FIG. 9 is a diagram for explaining a depth/edit control by a stereoscopic display device according to the second exemplary embodiment.

FIG. 9 shows an example of a depth/edit control by the stereoscopic display device 10 according to the present exemplary embodiment. The display control unit 44 first performs the automatic depth control. Specifically, when contact or proximity of an operating tool to the display surface 24 is detected, the display control unit 44 takes the stereoscopic photograph that is displayed in the depth direction of the contact position or the proximity position as the control target, and calculates the position of the stereoscopic photograph in the depth direction (the amount of depth). In the left diagram of FIG. 9, the stereoscopic photograph is shifted forward by the display control unit 44 based on the amount of depth so that a protruding part WA of the stereoscopic photograph comes to the display surface 24. As a result of performing the automatic depth control in this manner, the display position of the protruding part WA of the stereoscopic photograph comes to a position that is in contact or proximity with the operating tool.

Next, as in the middle diagram of FIG. 9, the depth adjustment unit 46 adjusts the depth at which the stereoscopic photograph is to be displayed. Here, the stereoscopic photograph is adjusted to be displayed at a position deeper than the position after the automatic control by the amount of Z'. By adjusting the position in the depth direction in the stereoscopic space in this manner, an arbitrary position in the stereoscopic space can be pointed to. In the right diagram of FIG. 9, writing is performed with a pen at a write position, which has been pointed to, on the sheet surface (the same position as the stereoscopic photograph) of the stereoscopic photograph in the stereoscopic space. This means that editing is performed by writing an arbitrary figure or letter in the stereoscopic space in the front of the stereoscopic photograph.

As a method for a user to input the amount of adjustment Z' of depth, there is a method of inputting the amount of adjustment Z' by operating a slider 24*a* provided on the display surface 24, as shown in the bottom right diagram of FIG. 24. The amount of adjustment Z' may also be input by the operation of a knob or a button that is not shown, instead of the slider 24*a*. It is also possible, as shown in the bottom left diagram of FIG. 24, to input the amount of adjustment Z' by a user operating a pinch 24*b*. It is also possible to input the amount of adjustment Z' by causing the knob to be pinched in the air and its proximity position to be detected, by the combination with the touch panel 20. The amount of adjustment Z' can also be input by a user operating a rotator 24*c*, as shown in the top left diagram of FIG. 24. The depth of a stereoscopic photograph 24*d* may be adjusted to 0, by tapping or double tapping, so that the display position of the stereoscopic photograph 24*d* that is displayed at the tapped or double tapped position coincides with the display surface 24, as shown in the top right diagram of FIG. 24. By inputting the amount of adjustment Z' by a user operation in this manner, a figure can be drawn at an arbitrary position in the stereoscopic space.

For example, an arbitrary figure can be written in a stereoscopic photograph in the stereoscopic space. The write position is calculated in the following manner. As in the above, a case where the stereoscopic photograph itself includes two disparities is taken as an example. As shown in the left diagram of FIG. 10, when taking the position vector of the eyes which are taken as the targets as Vc, the position vector of a pen tip as Vp, the distance between the eyes and the display surface as Lc, and the distance between the display surface and the stereoscopic photograph as Li, the position vector Vw of the write position is shown by formula (2), as follows:

$$Vw=(Lc+Li)/Lc\times(Vp-Vc)+Vc. \quad (2)$$

In the case of drawing in a stereoscopic photograph that is in the back of the display surface 24, a dot is written on a sheet surface for a left eye (shown as the sheet surface) at a point where a straight line connecting the virtual position of the left eye and the write position intersects the stereoscopic photograph. Likewise, a dot is written on a sheet surface for a right eye (shown as the sheet surface) at a point where a straight line connecting the virtual position of the right eye and the write position intersects the stereoscopic photograph. By simultaneously performing the above, it looks as if drawing is performed on the stereoscopic photograph.

Figure 10:
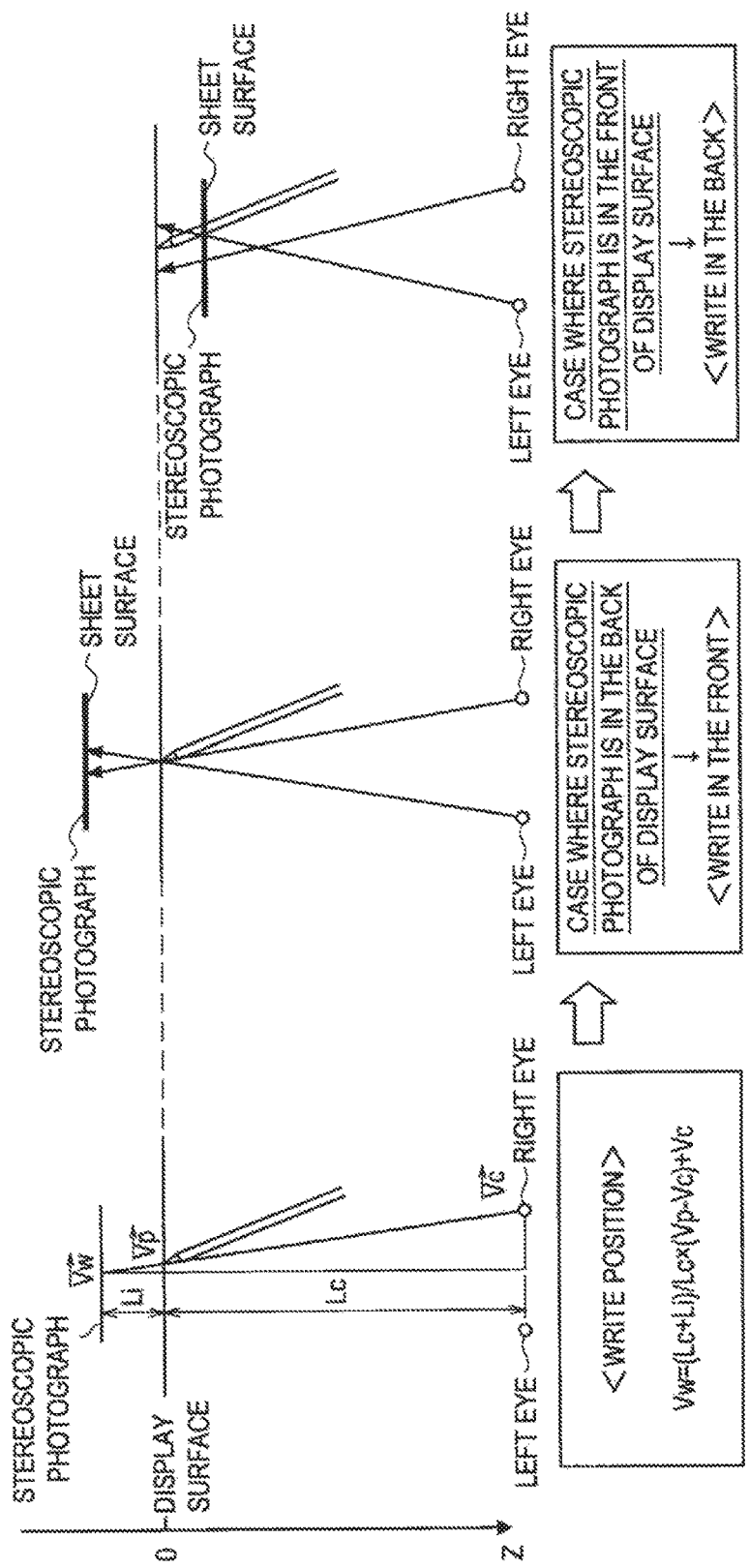
FIG. 10 is a diagram for explaining the depth/edit control by the stereoscopic display device according to the second exemplary embodiment.

In the case the stereoscopic photograph is displayed in the back of the display surface as shown in the middle diagram of FIG. 10, if writing is performed with a pen on a sheet surface that is virtually overlaid on the stereoscopic photograph, an image will be assumed to have been written in a space in the front of the stereoscopic photograph. On the other hand, as shown in the right diagram of FIG. 10, in the case the stereoscopic photograph is displayed in the front of the display surface, if writing is performed on the sheet surface with a pen, an image will be assumed to have been written in a space in the back of the stereoscopic photograph.

8. Depth/Edit Control by Stereoscopic Display Device (Second Exemplary Embodiment)

Figure 11:
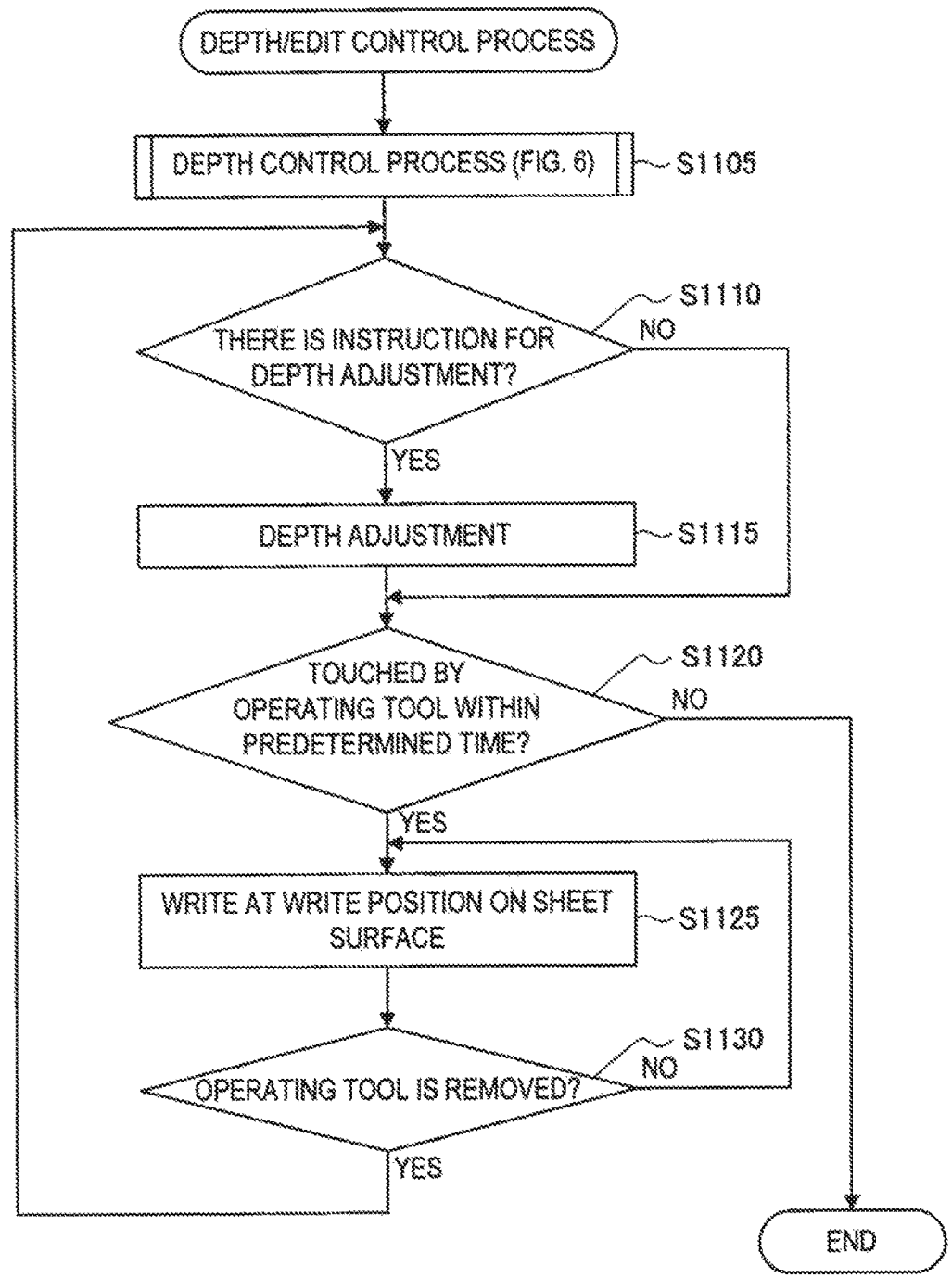
FIG. 11 is a flow chart showing a depth/edit control process by the stereoscopic display device according to the second exemplary embodiment.
Figure 12:
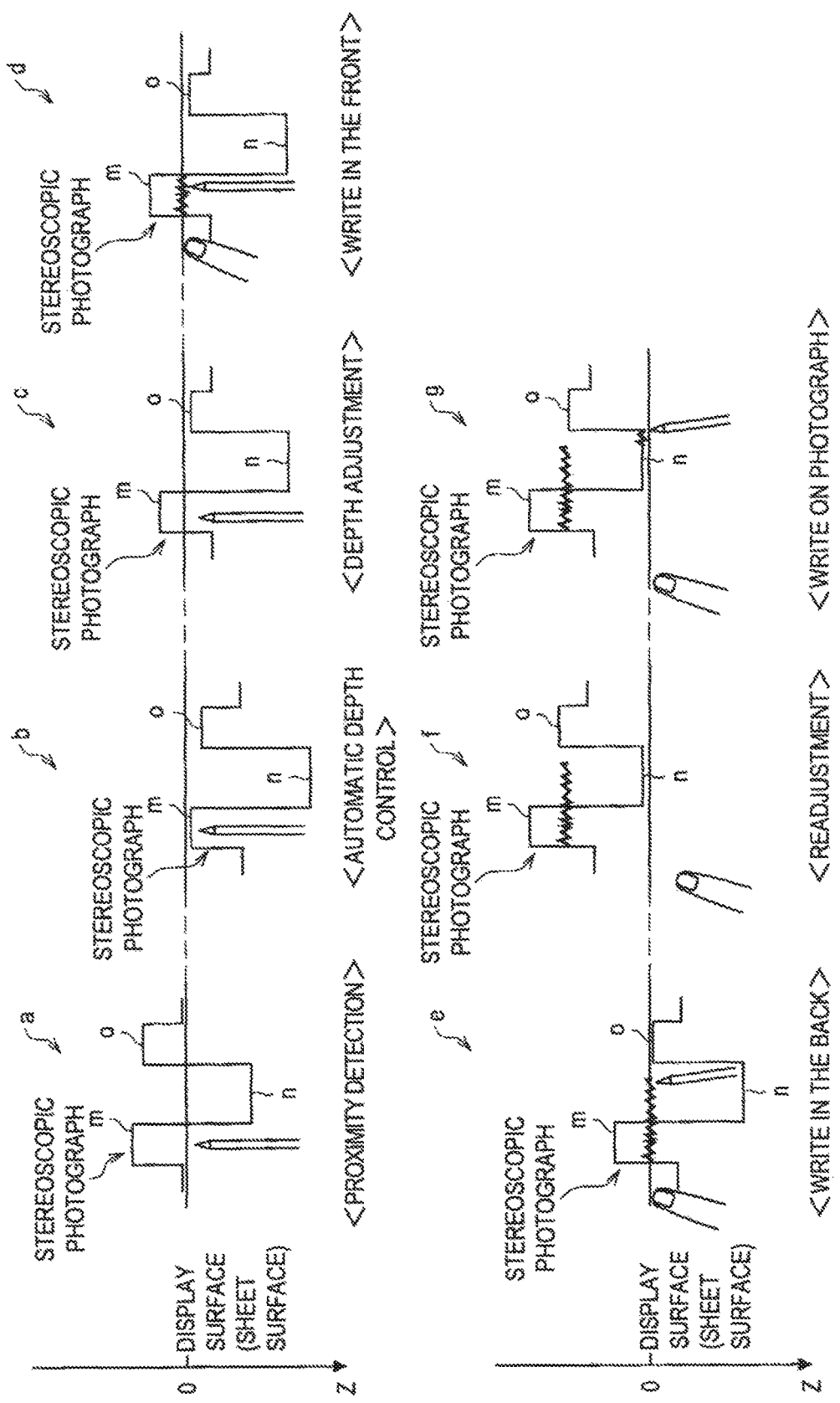
FIG. 12 is a diagram for explaining the depth/edit control process of FIG. 11.

Next, an operation of the stereoscopic display device 10 according to the present exemplary embodiment will be described. FIG. 11 is a flow chart showing a depth/edit control process for an operation of the stereoscopic display device 10. When the depth/edit control process is started, the display control unit 44 performs the depth control process shown by steps S605 to S625 of FIG. 6 (step S1105). The depth control process of FIG. 6 has been described in the first exemplary embodiment, and its explanation will be omitted here. For example, parts "a" and "b" of FIG. 12 show proximity detection and the automatic depth control performed in the depth control process. The stereoscopic photograph here includes subjects m, n, and o having different depths.

Next, the depth adjustment unit 46 determines whether an instruction for depth adjustment is received from a user (step S1110). In the case there is no input operation from the user regarding the amount of depth adjustment Z', the depth adjustment unit 46 skips step S1115. On the other hand, in the case there is an input operation from the user regarding the amount of depth adjustment Z', the depth adjustment unit 46 adjusts the depth of the stereoscopic photograph that is the control target (step S1115). In "c" of FIG. 12, the depth is adjusted such that the stereoscopic photograph is displayed further back.

Next, the proximity detection unit 42 detects whether an operating tool (finger, in this case) has contacted the display surface within a predetermined time (step S1120). In the case contact is not detected, the process is ended. On the other hand, in the case contact is detected, the image editing unit 48 performs desired writing/editing at the write position on the sheet surface (step S1125). This write/edit process is performed until the operating tool that is in contact with the display surface 24 is removed from the display surface 24 (repetition of steps S1130 and S1125). As a result, in "d" of FIG. 12, an image is written in the front of the subject m, and, in "e," an image is written in the back of the subject n. The subjects m and n correspond to the display objects, which are the control targets, displayed in the depth direction of the proximity position of the operating tool.

When the operating tool that is in contact with the display surface 24 is removed from the display surface 24, the process returns to step S1110, and the depth adjustment unit 46 determines again whether an instruction for depth adjustment is received from the user. In the case there is the instruction, the depth adjustment unit 46 again adjusts the depth of the stereoscopic photograph (step S1115: see FIG. 12, "f"). Then, in the case contact of the operating tool is again detected, the image editing unit 48 again performs desired writing/editing at the write position on the sheet surface (step S1125). In "g" of FIG. 12, an image is written at the write position on the sheet surface on the right side of the subject n in the stereoscopic photograph.

In the case the operating tool has been removed from the display surface 24 (step S1130), there has been no instruction for depth adjustment (steps S1110 and S1115), and a predetermined time has elapsed without the operating tool contacting the display surface 24 (step S1120), the write/edit process is ended.

Figure 13:
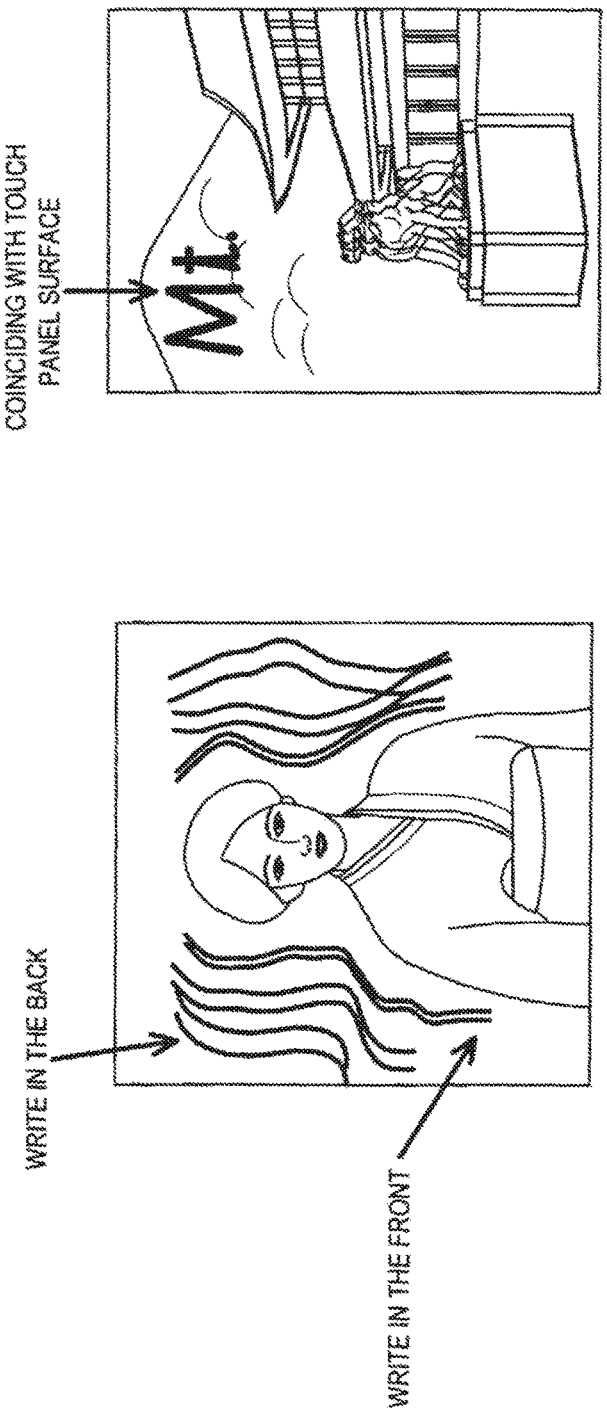
FIG. 13 is a diagram showing display screens which are results of the depth/edit control by the stereoscopic display device according to the second exemplary embodiment.

As has been described above, according to the stereoscopic display device 10 of the second exemplary embodiment, the subject for which the operating tool has issued an instruction can be made to float to the display surface by the automatic depth control, and any figure or letter can be written on the stereoscopic photograph. For example, in the right diagram of FIG. 13, the operating tool is brought into proximity of the mountain in the background, which is an example of the subject, and, as a result, the mountain is automatically controlled to be in a state of coincidence with the display surface. This can be seen from that the figure of the mountain includes no relative shift (disparity). When "Mt." is written on the mountain with a pen in this state, editing is performed to write a handwritten "Mt." on the image of the mountain. Additionally, in the right diagram of FIG. 13, the magnitude of the relative shift for the image of the subject in the front or the back of the display surface is expressed in two dimensions as a disparity. The images of the building on the right and the imperial guardian dog in the middle include relative shifts. Accordingly, it can be understood that the building and the imperial guardian dog are stereoscopically displayed popping out to the front or popping in to the back.

For example, in the case it is desired to write in the space in the front of the stereoscopic photograph, the depth is adjusted, according to the instruction for depth adjustment from the user, such that the stereoscopic photograph and the sheet surface are displayed in the back of the display surface. When writing is performed on the sheet surface in this state, writing can be performed three-dimensionally in the space in the front of the image of the stereoscopic photograph.

On the other hand, in the case it is desired to write in the space in the back of the stereoscopic photograph, for example, the depth is adjusted, according to the instruction for depth adjustment from the user, such that the stereoscopic photograph is displayed in the front of the display surface. When writing is performed on the sheet surface in this state, writing can be performed three-dimensionally in the space in the back of the image of the stereoscopic photograph. In the left diagram of FIG. 13, the magnitude of relative shift of a pair of curved lines written in the front or the back of the display surface is expressed in two dimensions as a disparity. Although it is not understood from the drawing, the pair of curved lines nearest to the woman is written in the front and has a small relative shift. Accordingly, the pair of curved lines is displayed popping out a little to the front of the woman. On the other hand, although it is not understood from the drawing, the two pairs of curved lines distant from the woman are written in the back and have large relative shifts. Accordingly, it can be understood that the more to the side a pair of curved lines is, the deeper in the back it is displayed. In this manner, according to the stereoscopic display device 10 of the second exemplary embodiment, an image can be written on the stereoscopic photograph or in the front or the back of the stereoscopic photograph and editing can be performed.

9. An Exemplary Depth/Edit Control Process (Second Exemplary Embodiment)

Figure 14:
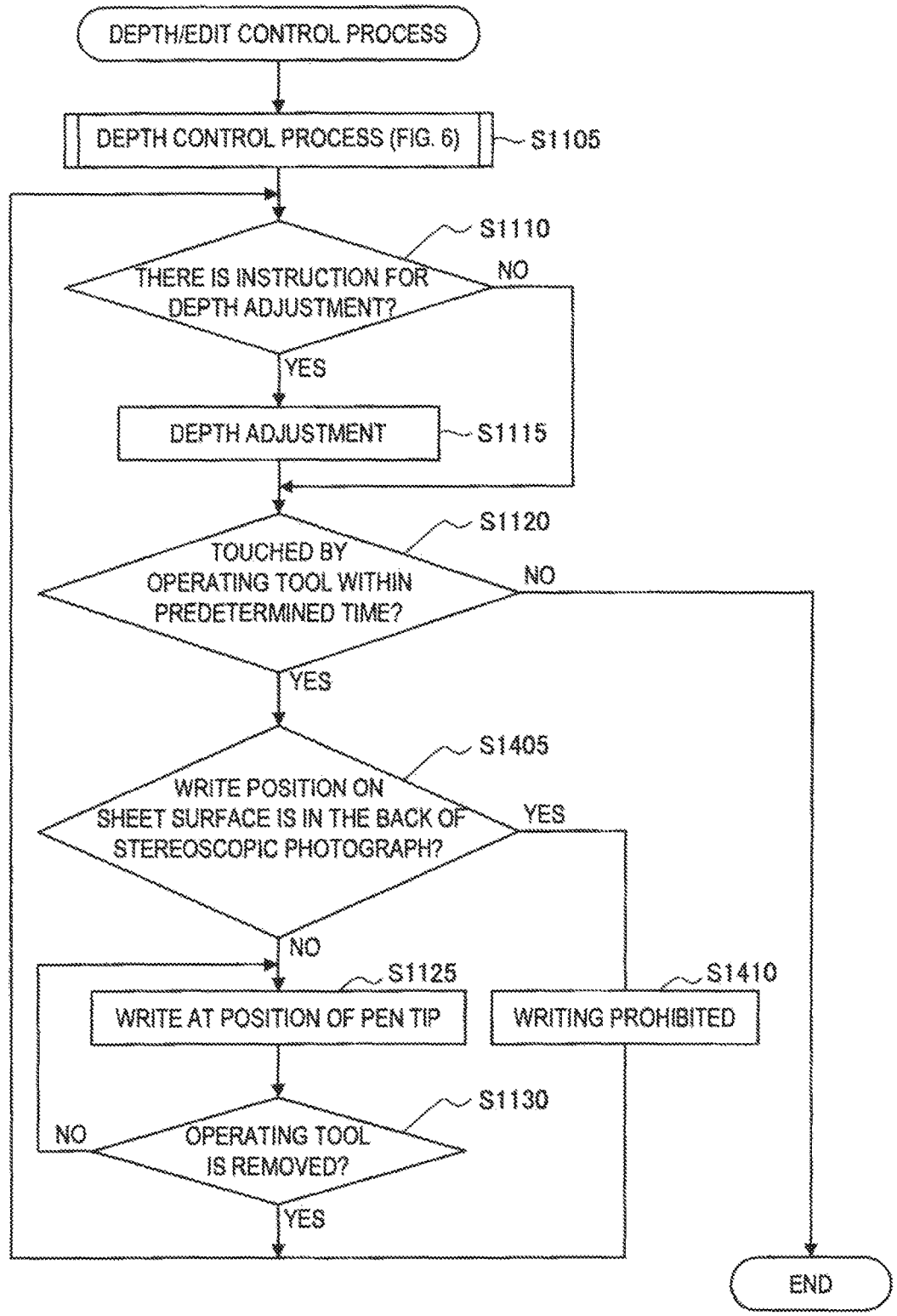
FIG. 14 is a flow chart showing a depth/edit control process by a stereoscopic display device according to a modified example 1 of the second exemplary embodiment.

As described above, when it becomes possible to freely draw in the stereoscopic space within the stereoscopic photograph, a case may arise where an odd feeling is caused regarding display with respect to the disparity of the original stereoscopic photograph and the written image. For example, if writing can be performed in the back of a stereoscopic photograph that is brought to the front, an odd feeling or an unpleasant feeling may arise regarding the stereoscopic display. To prevent such a case, according to a modified example 1, the positional relationship between the position of the stereoscopic photograph in the depth direction and the write position of the image is determined by calculating each relative shift between pixels of left and right images of the original stereoscopic photograph in advance and comparing the same with the relative shift between the left and right calculated from the write position, thereby preventing an image from being written in the back of the stereoscopic photograph. In the following, an operation of the stereoscopic display device 10 according to the modified example 1 of the present embodiment will be described with reference to the flow chart of FIG. 14 showing a depth/edit control process.

When the depth control process is started, the display control unit 44 performs the depth control process shown in FIG. 6 (step S1105). The depth control process is the same as that of the second embodiment, and its explanation will be omitted here.

Next, in the case an instruction for depth adjustment is received from the user, the depth adjustment unit 46 adjusts the depth of the stereoscopic photograph (steps S1110 and S1115). The depth adjustment process is also the same as that of the second embodiment, and its explanation will be omitted here.

Next, a write control of the modified example 1 will be described. The proximity detection unit 42 detects whether the operating tool has contacted the display surface 24 within a predetermined time (step S1120), and, in the case contact is not detected, ends the process. On the other hand, in the case contact is detected, the image editing unit 48 determines whether the write position on the sheet surface is positioned in the back of the stereoscopic photograph (step S1405). As described above, whether the write position on the sheet surface is positioned in the back of the stereoscopic photograph is determined by calculating each relative shift between pixels of left and right images of the original stereoscopic photograph in advance and comparing the same with the relative shift between the left and right calculated from the write position. In the case the write position is not positioned in the back of the stereoscopic photograph, the image editing unit 48 performs desired writing/editing at the write position as usual (step S1125). This write/edit process is performed until the operating tool that is in contact with the display surface 24 is removed from the display surface 24 (repetition of steps S1130 and S1125).

Figure 15:
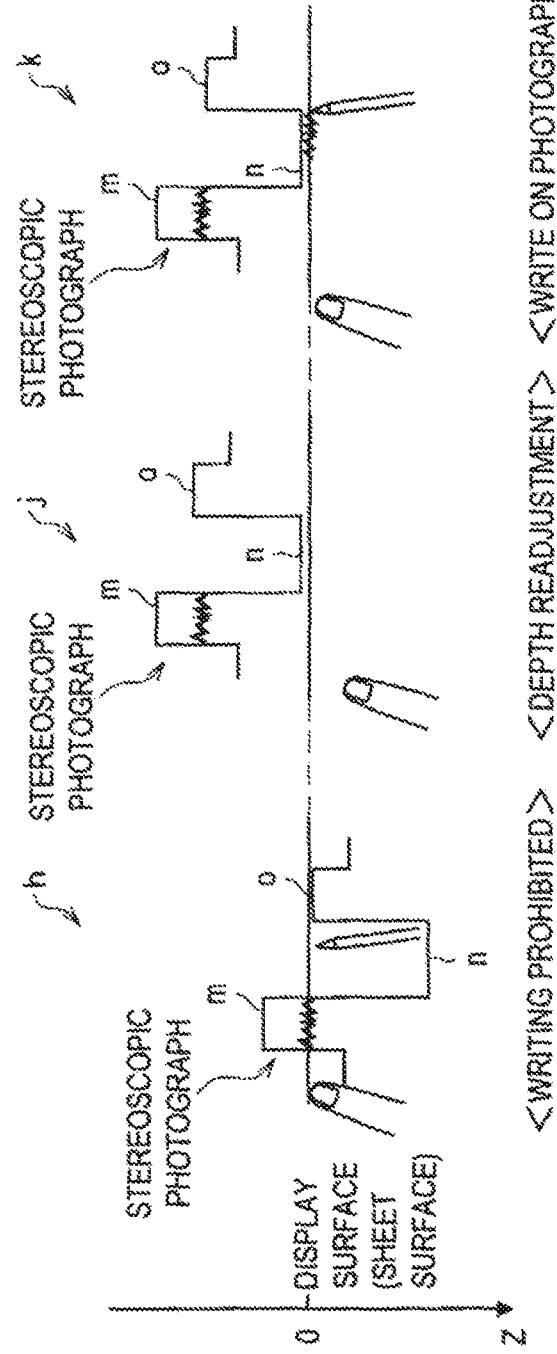
FIG. 15 is a diagram for explaining the depth/edit control process of FIG. 14.

On the other hand, in the case the write position is positioned in the back of the stereoscopic photograph, since writing will have to be performed in the back of the stereoscopic photograph that is brought to the front, the image editing unit 48 prohibits writing at such write position (step S1410). In "h" of FIG. 15, writing in the back of the subject n that is displayed in the front of the display surface is prohibited.

When the operating tool that is in contact with the display surface 24 is removed from the display surface 24 (step S1130) or when writing is prohibited (step S1410), the process returns to step S1110, and the depth adjustment unit 46 determines again whether an instruction for depth adjustment is received from the user. In the case there is the instruction, the depth adjustment unit 46 readjusts the depth of the stereoscopic photograph (see "j" in FIG. 15), and performs again desired writing/editing at the write position on the sheet surface. In "k" of FIG. 15, a state is shown where an image is written, after the readjustment, in the front of the subject n that is displayed in the back of the display surface 24.

In the case the operating tool has been removed from the display surface 24 (step S1130), there has been no instruction for depth adjustment (steps S1110 and S1115), and a predetermined time has elapsed without the operating tool contacting the display surface 24 (step S1120), the write/edit process is ended.

As has been described, according to the modified example 1 of the second embodiment, by prohibiting writing of an image in the back of the stereoscopic photograph, it becomes possible to prevent an odd feeling from being caused regarding display with respect to the disparity of the original stereoscopic photograph and the written image.

10. An Additional Exemplary Depth/Edit Control Process (Second Exemplary Embodiment)

Figure 16:
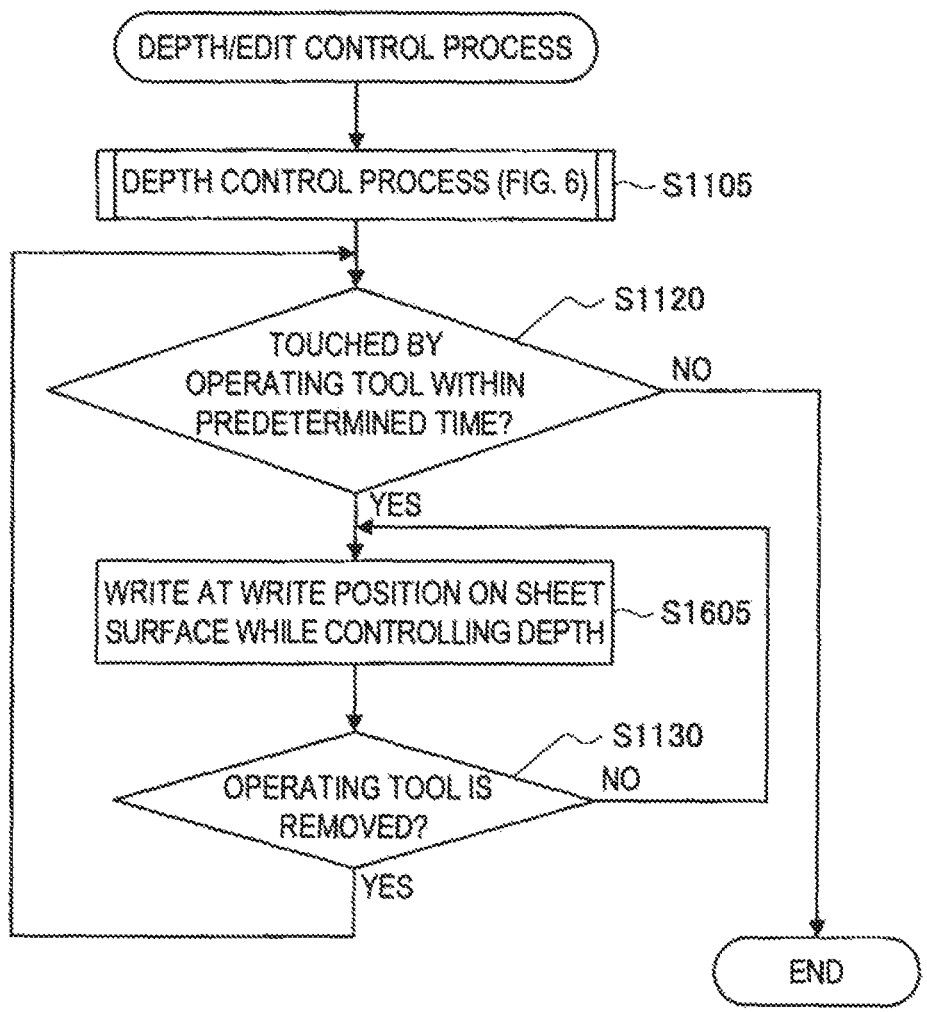
FIG. 16 is a flow chart showing a depth/edit control process by a stereoscopic display device according to a modified example 2 of the second exemplary embodiment.

In the modified example 1, writing in the back of the stereoscopic photograph has been prohibited to prevent an odd feeling regarding display with respect to the disparity of the original stereoscopic photograph and the writing. On the other hand, in a modified example 2, the automatic depth control is performed together with the writing/editing of an image so that an image is written on the stereoscopic photograph. In the following, an operation of the stereoscopic display device 10 according to the modified example 2 of the present exemplary embodiment will be described with reference to the flow chart of FIG. 16 showing a depth/edit control process.

Figure 17:
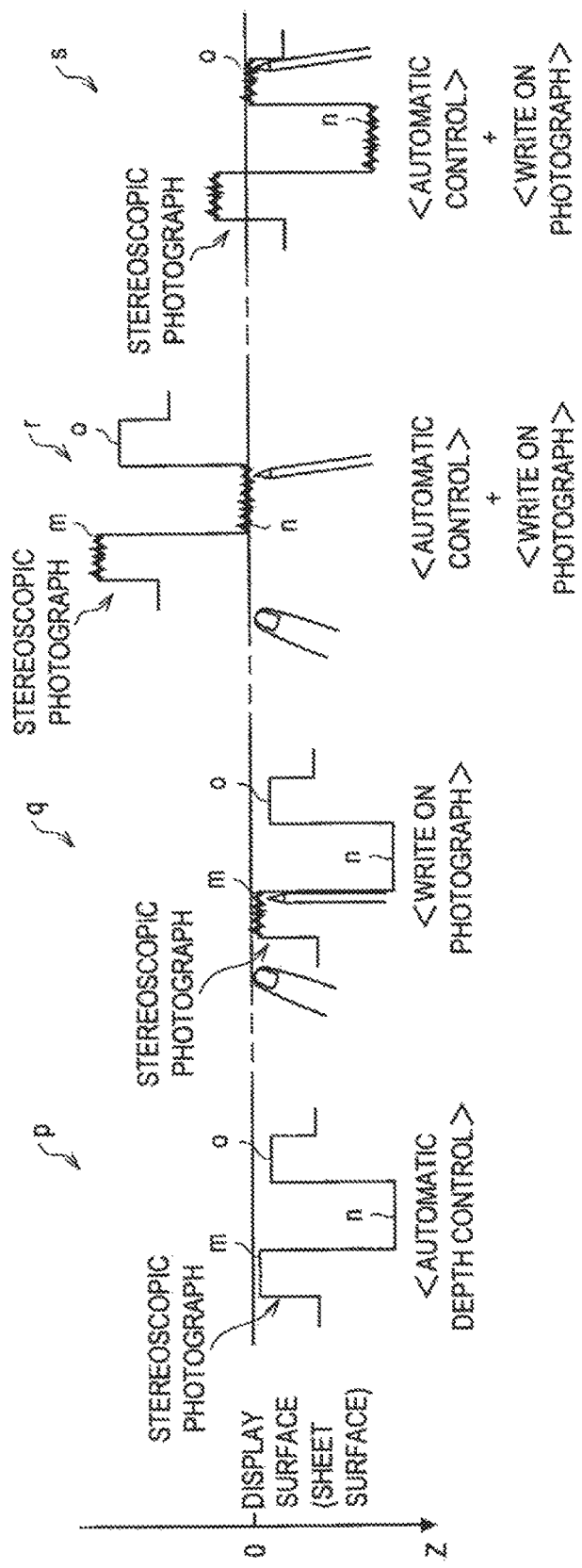
FIG. 17 is a diagram for explaining the depth/edit control process of FIG. 16.

When the depth control process is started, the display control unit 44 performs the depth control process shown in FIG. 6 (see, e.g., step S1105 and "p" of FIG. 17). The depth control process (automatic) is the same as that of the second exemplary embodiment, and its explanation will be omitted here.

Next, a write control of the modified example 2 will be described. The proximity detection unit 42 detects whether the operating tool has contacted the display surface 24 within a predetermined time (step S1120), and, in the case contact is not detected, ends the process. On the other hand, in the case contact is detected, the image editing unit 48 performs desired writing/editing at the write position on the sheet surface while performing the automatic depth control process of FIG. 6 (step S1605). This write/edit process is performed until the operating tool that is in contact with the display surface 24 is removed from the display surface 24 (repetition of steps S1130 and S1605). In "q" of FIG. 17, writing on a subject m is performed while the depth is automatically controlled such that the subject m coincides with the display surface. In "r" of FIG. 17, writing is performed on a subject n while the depth is automatically controlled such that the subject n coincides with the display surface. In "s" of FIG. 17, writing is performed on a subject o while the depth is automatically controlled such that the subject o coincides with the display surface.

When the operating tool that is in contact with the display surface 24 is removed from the display surface 24 (step S1130), the process returns to step S1120, and, in the case a predetermined time has elapsed without the operating tool contacting the display surface 24 (step S1120), the write/edit process is ended.

As has been described, according to the modified example 2 of the second exemplary embodiment, the automatic depth control is performed together with the writing/editing of an image so that an image is written on the stereoscopic photograph. This can prevent an odd feeling from being caused regarding display with respect to the original stereoscopic photograph and the written image.

11. Reduction/Enlargement Control by Stereoscopic Display Device (Third Exemplary Embodiment)

Next, a function and an operation of the stereoscopic display device 10 according to a third exemplary embodiment of the present disclosure will be described. A function of the stereoscopic display device 10 according to the third exemplary embodiment is executed by each unit of the functional block shown in FIG. 8. However, with the display control unit 44 of the third exemplary embodiment, in the case proximity or contact of the operating tool is detected, image content including the stereoscopic photograph is displayed after being reduced to a desired size. In the following, a depth control process by the stereoscopic display device 10 according to the third exemplary embodiment will be described, focusing on this difference.

Figure 18:
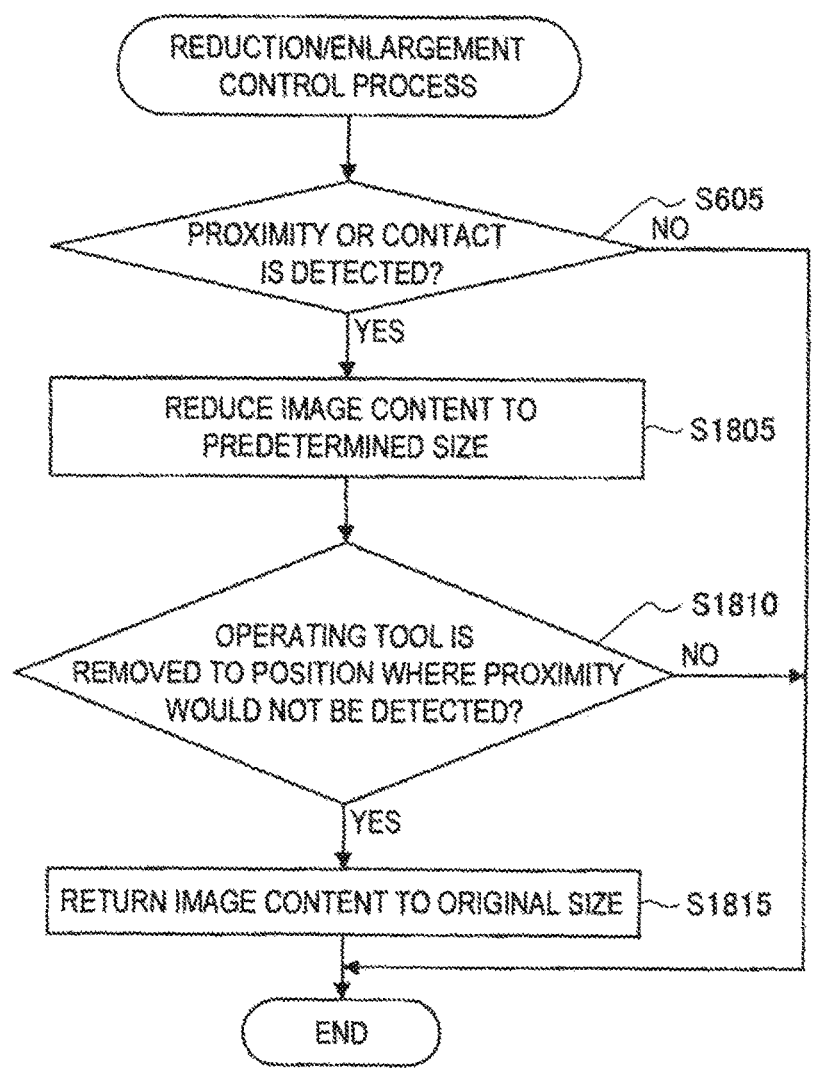
FIG. 18 is a flow chart showing a depth control process by a stereoscopic display device according to the third exemplary embodiment.
Figure 19:
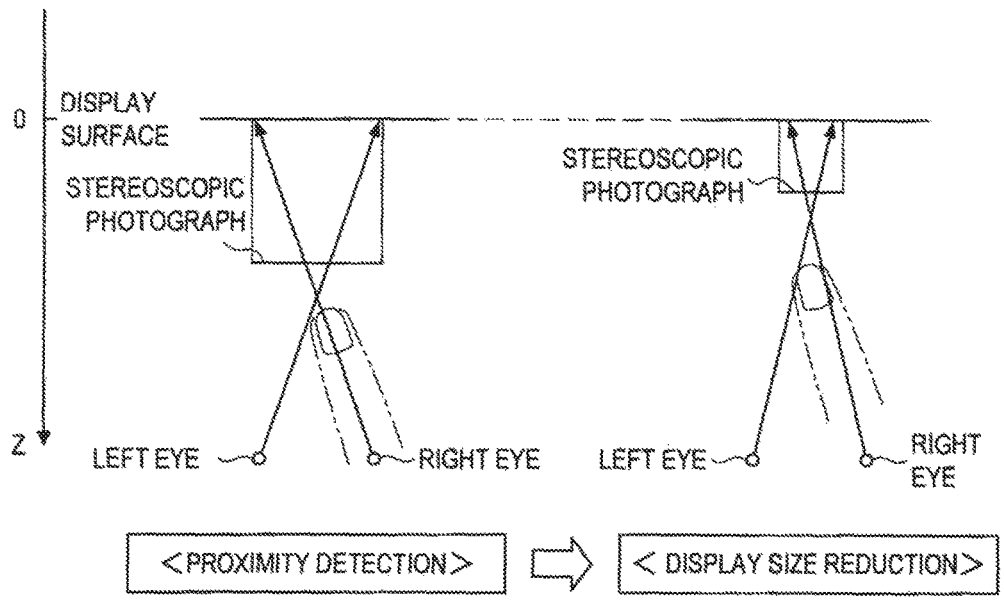
FIG. 19 is a diagram for explaining a depth/edit control process by the stereoscopic display device according to the third exemplary embodiment.

FIG. 18 is a flow chart showing a reduction/enlargement control process by the stereoscopic display device 10 according to the third exemplary embodiment. When the reduction/enlargement control process is started, the display control unit 44 determines whether proximity or contact is detected by the proximity detection unit 42 (step S605). In the case neither proximity nor contact is detected, the process is ended. On the other hand, in the case proximity or contact is detected, the display control unit 44 reduces the image content (including the stereoscopic photograph) displayed on the display surface 24 to a predetermined size (step S1805). FIG. 19 shows a state where the stereoscopic photograph is automatically reduced at the time proximity of the operating tool is detected.

Next, the display control unit 44 determines whether the operating tool is removed to a position at which proximity would not be detected by the proximity detection unit 42 (step S1810). In the case the operating tool is not removed, the process is ended with the image content reduced to the predetermined size. In the case the operating tool is removed to a position at which proximity would not be detected, the display control unit 44 returns the image content displayed on the display surface 24 to its original size (step S1815), and ends the process.

Figure 20:
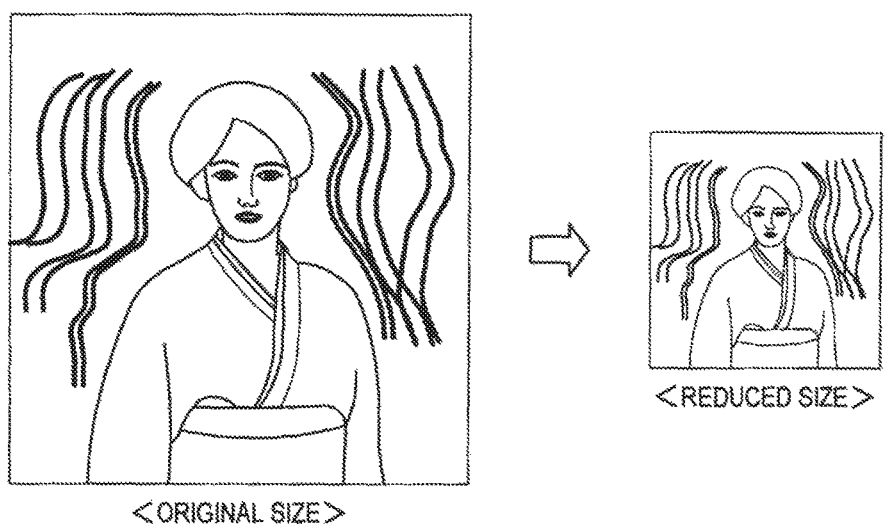
FIG. 20 is a diagram showing a display screen which is a result of the depth/edit control by the stereoscopic display device according to the third exemplary embodiment.

As has been described, according to the stereoscopic display device 10 of the third exemplary embodiment, in the case the part of the stereoscopic photograph that is popping out of the display surface overlaps or is likely to overlap with the operating tool, the visual size of the stereoscopic photograph is changed so as to remove the odd feeling that is based on a mismatch, as if the operating tool is sunk into the stereoscopic photograph. For example, when the entire image shown in the left diagram of FIG. 20 is reduced as the right diagram of FIG. 20, the relative shifts of the curved lines written on both sides of the woman become small. By changing the relative difference between the left and right images with respect to the disparity in this manner by changing the visual size of the stereoscopic photograph, the sense of depth of the stereoscopic photograph can be reduced. This can reduce the overlapping between the operating tool and the stereoscopic photograph, and reduce the odd feeling regarding the appearance.

For example, if the image of a stereoscopic photograph whose pop-out amount is 1 cm is reduced to half, the pop-out amount of the photograph will be 0.5 cm. The odd feeling regarding display caused by the overlapping between the operating tool in the real space and an object in the virtual space can be reduced in this manner. Particularly, according to the present exemplary embodiment, controlling the depth of the stereoscopic photograph by calculating the amount of depth, as in the first exemplary embodiment, is unnecessary to reduce/enlarge the entire image. Thus, according to the present exemplary embodiment, calculation for the depth control becomes unnecessary, and the process can be simplified.

Furthermore, the display control unit 44 may also determine the rate of reduction of image content according to the amount of depth of a stereoscopic photograph with the greatest depth, among one or more stereoscopic photographs included in the image content. An odd feeling caused at the time the operating tool and the stereoscopic photograph overlap with each other is greater as the maximum protrusion amount is greater. Accordingly, by increasing the rate of reduction in this case, an odd feeling experienced by the user can be reduced.

Additionally, it is also possible to combine the image reduction/enlargement process of the present exemplary embodiment and the depth control of the one or more of the disclosed exemplary embodiments. In addition to the reduction/enlargement control process of FIG. 18, adjustment of the position in the depth direction of the stereoscopic photograph that is the control target by the depth adjustment unit 46 may also be performed according to an operation by the user.

12. Combinations of Additional Exemplary Embodiments

The stereoscopic display methods of the disclosed exemplary embodiments described above may be combined as appropriate for application. For example, the display control unit 44 may perform control so as to enlarge and display image content after controlling the position in the depth direction of the display object that is the control target to coincide with the display surface (touch surface) or to be in the back of the touch surface, before the image is edited by the image editing unit 48.

Furthermore, for example, in the case proximity of the operating tool is detected, the display control unit 44 may, together with reducing and displaying the image content, take a display object displayed in the depth direction of the proximity position of the operating tool as the control target and control the position, in the depth direction, of the display object to come near or coincide with the proximity position of the operating tool.

Figure 21:
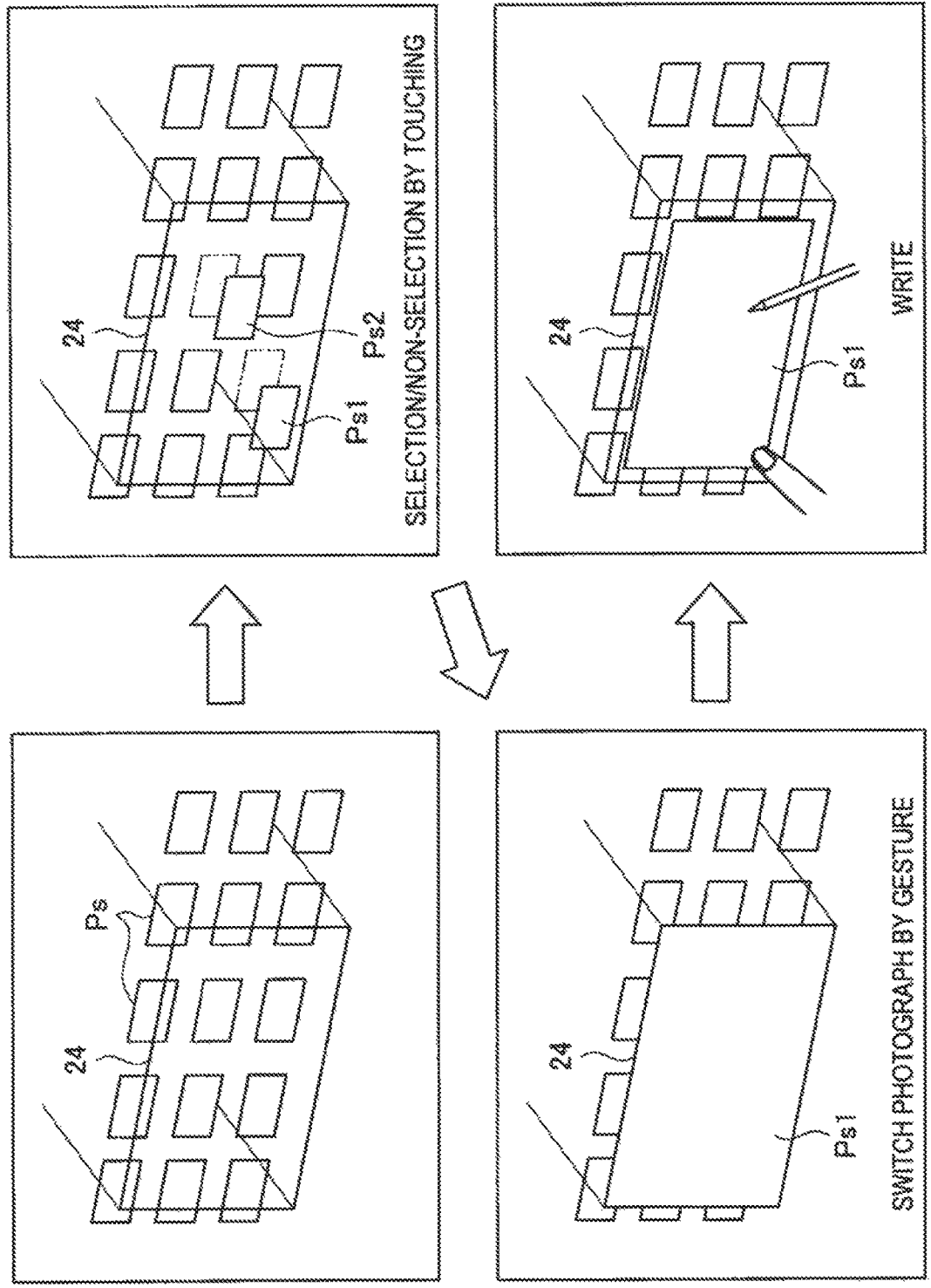
FIG. 21 is a diagram for explaining an example of a depth/edit control process according to additional exemplary embodiments.
Figure 22:
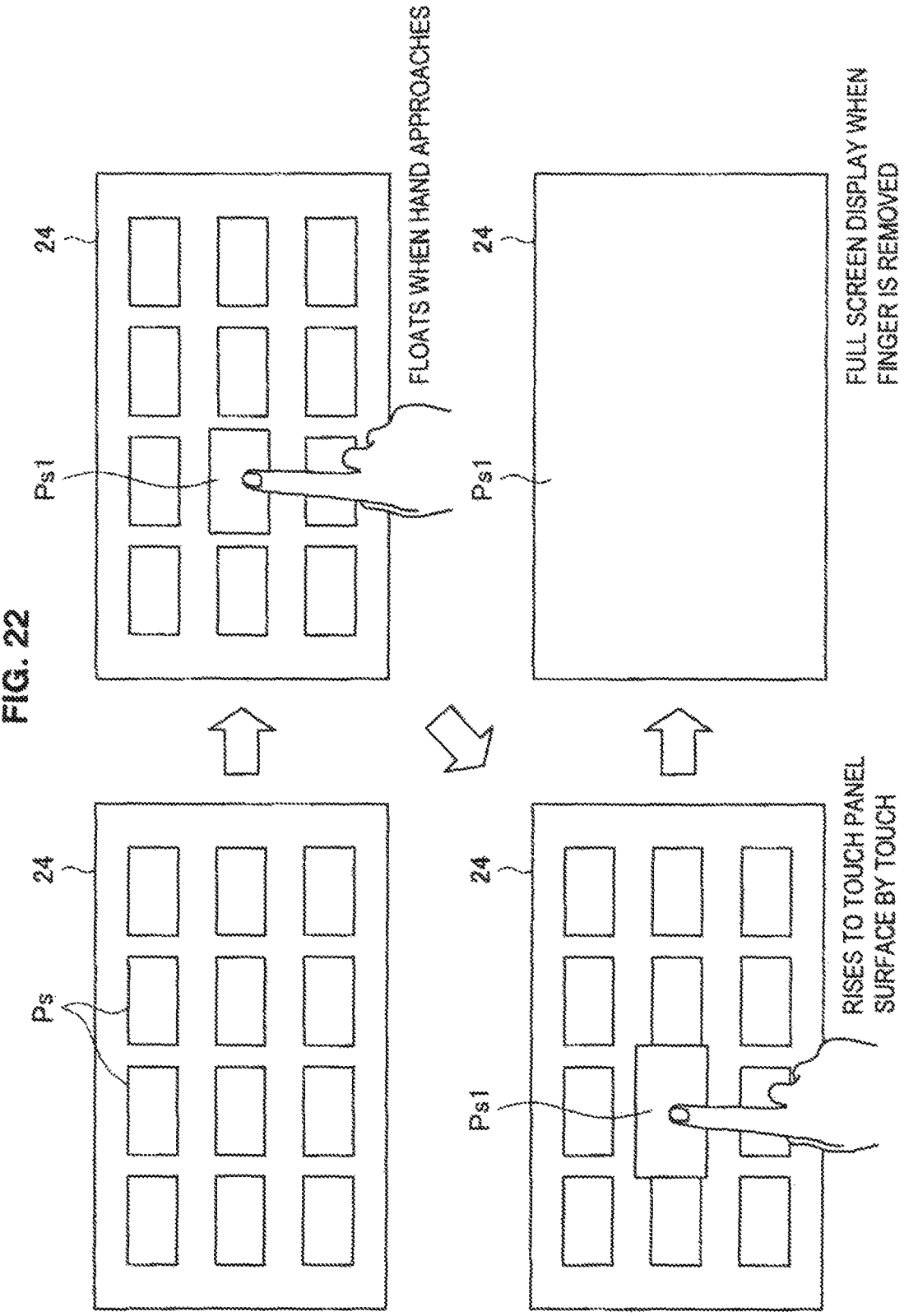
FIG. 22 is a diagram for explaining an example of a depth/edit control process according to additional exemplary embodiments.

Examples of combinations of the disclosed exemplary embodiments will be specifically described with reference to FIGS. 21 and 22. In the case thumbnails Ps of a plurality of stereoscopic photographs are lined up in the back of the display surface 24 of the stereoscopic display device 10 as in the top left diagram of FIG. 21, a desired stereoscopic photograph is selected by causing the operating tool to touch an arbitrary position on the display surface 24. In the top right diagram of FIG. 21, two stereoscopic photographs Ps1 and Ps2 are selected by touching, and the display positions of the stereoscopic photographs Ps1 and Ps2 are made to coincide with the display surface 24 by causing the amount of depth of the stereoscopic photographs to be 0 by the depth control of the first exemplary embodiment. In FIG. 22, when a hand is neared to the display surface 24, the depth of the stereoscopic photograph is controlled such that it comes near the position of the hand and the stereoscopic photograph Ps1 floats (top right diagram of FIG. 22), and, by the hand touching the display surface 24, the stereoscopic photograph Ps1 is displayed at a position coinciding with the display surface 24 (bottom left diagram of FIG. 22). When the hand is removed, switching to the full screen display of the stereoscopic photograph Ps1 is performed (bottom right diagram of FIG. 22). The desired stereoscopic photograph Ps1 may also be enlarged to full screen and be displayed by other gestures (bottom left diagram of FIG. 21). In this state, as indicated in the second exemplary embodiment, writing is started with the hand in contact with the stereoscopic photograph Ps1 (bottom right diagram of FIG. 21).

When trying to touch the display surface 24 with a hand while the stereoscopic photograph Ps1 is displayed in an enlarged manner, interference between the hand and the stereoscopic photograph Ps1 is likely to occur, but the interference can be reduced by performing the depth adjustment to pull the image of the stereoscopic photograph Ps1 back in the depth direction. Furthermore, the interference can be reduced by reducing the image of the stereoscopic photograph Ps1 together with performing the depth adjustment (bottom right diagram of FIG. 21).

Figure 23:
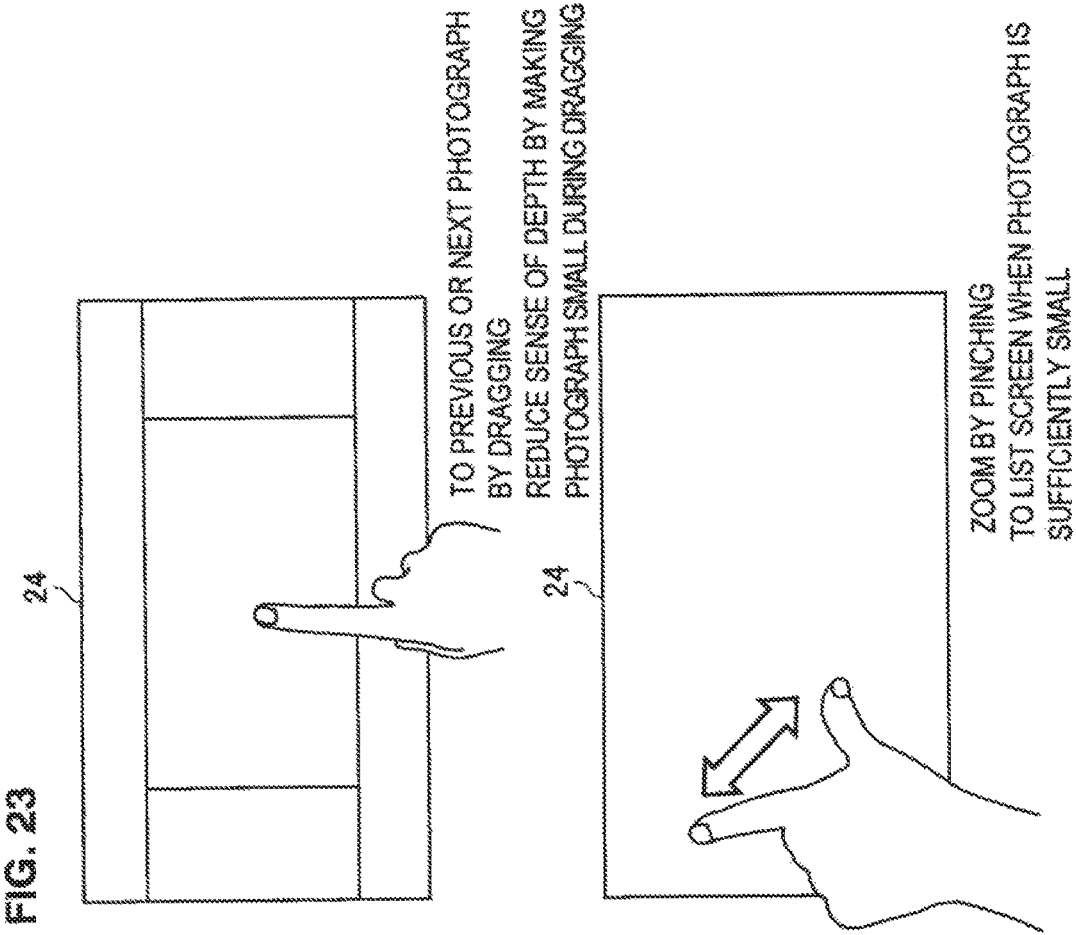
FIG. 23 is a diagram for explaining screen transition.

Additionally, as the gesture for changing the screen display, it is conceivable to move to the previous or the next photograph by waving the hand in proximity as shown in the top left diagram of FIG. 23 or to move to the previous or the next photograph by dragging as shown in the top right diagram of FIG. 23, and during the movement to the previous or the next photograph, an odd feeling caused due to the mismatch between the sense of distance to the stereoscopically displayed display object and the sense of distance to the operating tool can be reduced by reducing the sense of depth by reducing the size of the photograph.

It is also possible to move from a state where one stereoscopic photograph is displayed in an enlarged manner as shown in the bottom left diagram of FIG. 23 to a display of a list of thumbnails by double tapping. As shown in the bottom right diagram of FIG. 23, it is also possible to zoom in by pinching and move to the display of a list of thumbnails when the stereoscopic photograph is sufficiently small. Also in these cases, during enlarged display of a stereoscopic photograph, depth adjustment is performed to pull the photograph to the back, and an odd feeling caused due to the mismatch between the sense of distance to the stereoscopically displayed display object and the sense of distance to the operating tool is reduced. Then, when it has moved to the display of a list of thumbnails, depth adjustment is performed to bring the photograph close to the display surface 24, thereby improving the operability of the user.

In this manner, in the case proximity of the operating tool is detected, the display control unit 44 may take a display object displayed in the depth direction of the proximity position of the operating tool as the control target and move the position of the display object in the depth direction to be further backward, together with performing reducing display of the image content. Furthermore, the display control unit 44 may display the image content to be more reduced as the distance between the display surface 24 and the proximity position of the operating tool becomes shorter, and may display the image content to be more enlarged as the distance between the display surface 24 and the operating tool becomes longer.

As described, according to the disclosed exemplary embodiments, an odd feeling caused due to the mismatch, regarding the sense of distance, between the stereoscopically displayed display object and the operating tool can be reduced by appropriately controlling the display method of the display object according to proximity or contact of the operating tool.

For example, in the first exemplary embodiment, the amount of depth of the stereoscopic photograph from the display surface 24 is estimated, by using the touch panel 20 capable of proximity detection, from the relative shift (disparity) between the left and right images at the point the operating tool has neared, and the position of the stereoscopic photograph is controlled such that the proximity position of the operating tool and the amount of depth coincide with each other. This can eliminate the odd feeling caused due to the mismatch, regarding the sense of distance, between the display object and the operating tool, and, also, the operability of the user can be improved.

Furthermore, for example, in the second exemplary embodiment, a position in the three dimensions can be specified in the same manner as specifying a position in two dimensions by manipulating the XY coordinates at which writing is desired and causing the Z coordinate to match the display surface (touch surface), by using the touch panel 20 capable of proximity detection, and a letter or a figure can be written in an arbitrary position in the stereoscopic space where the stereoscopic photograph is displayed.

Furthermore, for example, in the third exemplary embodiment, when proximity of the operating tool is detected while the stereoscopic photograph is formed at a position popping out of the display surface 24 of the touch panel 20, the size of the stereoscopic photograph is reduced. This can easily reduce an odd feeling regarding display in the depth direction while maintaining good operability for the user.

Furthermore, by appropriately combining the stereoscopic display method of the above exemplary embodiments, an odd feeling caused due to the mismatch, regarding the sense of distance, between the display object and the operating tool can be effectively reduced.

In the first to third exemplary embodiments and the modified examples described above, the operations of the respective units are related to each other, and replacement by a series of operations or a series of processes, in consideration of their relationships, is possible. This can cause the exemplary embodiment of an information processing apparatus to execute a stereoscopic display method, and a processor of the information processing apparatus may execute instructions stored on a tangible, non-transitory computer-readable medium to cause the processor to realize the function of the information processing apparatus.

It should be understood by those skilled in the art that various modifications, combinations, sub-combinations and alterations may occur depending on design requirements and other factors insofar as they are within the scope of the appended claims or the equivalents thereof.

For example, in each of the exemplary embodiments described above, a method according to which a touch panel detects three states, namely, non-proximity, proximity and contact, and a display method of a display object is controlled according to the detection result has been described, but the stereoscopic display method according to the present disclosure is not limited to such. For example, in the case the distance between the display surface and the display object can be detected in steps or sequentially by the touch panel, the display object may be pushed back in the depth direction in steps or continuously according to the distance. Such a modification is also within the technical scope of the present disclosure.

What is claimed is:

1. An information processing apparatus, comprising:
   circuitry configured to
      control display of an image to be stereoscopically perceivable by a user,
      detect proximity between a portion of an operating tool of the user and a display surface,
      receive an operation of the operating tool,
      determine a location of the received operation,
      determine a depth of the received operation based on the detected proximity between the portion of the operating tool and the display surface,
      adjust display of the image based on the determined location and the determined depth of the received operation, and
      control display of the image such that the user perceives the operation tool portion as writing in front or in back of the displayed image.

2. The information processing apparatus of claim 1, wherein the location of operation coincides with a position upon the display surface at which the image is displayed.

3. The information processing apparatus of claim 1, wherein the operating tool is a finger of the user.

4. The information processing apparatus of claim 1, wherein, in response to the determination of the location of operation, the circuitry further is configured to define a display position of displaying the image as being coincident with the display surface in the depth direction.

5. The information processing apparatus of claim 1, wherein the circuitry is further configured to control display of the image such that the user perceives the operating tool portion to contact the displayed image.

6. The information processing apparatus of claim 1, wherein the circuitry is further configured to
   receive, from the user, information indicative of a display position of the image, and
   define the display position of the image, based on at least the received information.

7. The information processing apparatus of claim 6, wherein the circuitry is further configured to detect a gesture of the user.

8. The information processing apparatus of claim 7, wherein the circuitry is further configured to define the display position based on at least the detected gesture.

9. The information processing apparatus of claim 6, wherein the circuitry is further configured to determine a proximity position of the operating tool portion disposed within a threshold distance of the display surface.

10. The information processing apparatus of claim 9, wherein the circuitry is further configured to define the display position based on the proximity position, the display position being defined relative to the display surface in the depth direction.

11. The information processing apparatus of claim 10, wherein the circuitry is further configured to determine a successive proximity position of the operating tool portion disposed within the threshold distance, the determination of the successive proximity position being in response to a motion of the operating tool in the depth direction.

12. The information processing apparatus of claim 11, wherein the circuitry is further configured to
   determine a successive display position of the image based on at least the display position of the image and the successive proximity position of the operating tool portion; and
   generate a signal to display the image at the successive display position.

13. The information processing apparatus of claim 1, further comprising a display unit configured to display the image at a display position.

14. The information processing apparatus of claim 13, wherein the display unit comprises the display surface.

15. The information processing apparatus of claim 1, wherein the circuitry controls display of a plurality of images to each be stereoscopically perceivable by the user at respective display positions.

16. The information processing apparatus of claim 15, wherein the plurality of images are displayed as being overlapping with each other.

17. The information processing apparatus of claim 1, wherein the circuitry is further configured to append or edit the stereoscopically perceivable image based on the operation of the portion of the operating tool.

18. A computer-implemented method for displaying images, the method comprising:
  displaying an image to be stereoscopically perceivable by a user;
  detecting proximity between a portion of an operating tool of the user and a display surface;
  receiving an operation of the operating tool;
  determining a location of the received operation;
  determining a depth of the received operation based on the detected proximity between the portion of the operating tool and the display surface;
  adjusting display of the image based on the determined location and the determined depth of the received operation; and
  controlling display of the image such that the user perceives the operation tool portion as writing in front or in back of the displayed image.

19. A tangible, non-transitory computer-readable medium having embodied thereon a program, which when executed by a computer cause the computer to execute a method, the method comprising:
  displaying an image to be stereoscopically perceivable by a user;
  detecting proximity between a portion of an operating tool of the user and a display surface;
  receiving an operation of the operating tool;
  determining a location of the received operation;
  determining a depth of the received operation based on the detected proximity between the portion of the operating tool and the display surface;
  adjusting display of the image based on the determined location and the determined depth of the received operation; and
  controlling display of the image such that the user perceives the operation tool portion as writing in front or in back of the displayed image.

* * * * *